(12) United States Patent
Ishida et al.

(10) Patent No.: US 6,493,767 B1
(45) Date of Patent: Dec. 10, 2002

(54) NETWORK ADDRESS SUPPLY SYSTEM FOR TRANSMITTING AN ADDRESS SUPPLY REQUEST TO ONLY A SERVER

(75) Inventors: Toshihiro Ishida, Kanagawa (JP); Osamu Sekihata, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/774,171

(22) Filed: Dec. 26, 1996

(30) Foreign Application Priority Data

Jan. 17, 1996 (JP) .............................................. 8-006159

(51) Int. Cl.[7] .......................... H04L 12/56; H04L 12/46; G06F 13/00
(52) U.S. Cl. ........................ 709/249; 709/245; 709/238; 709/230; 709/270
(58) Field of Search ........................ 395/200.75, 200.79, 395/200.5, 200.54; 370/401, 402, 396, 397, 522, 392; 709/249, 245, 238, 230, 270

(56) References Cited

U.S. PATENT DOCUMENTS 4,823,338 A * 4/1989 Chan et al. .................. 370/522
5,150,464 A * 9/1992 Sidhu et al. ........... 395/200.75

(List continued on next page.)

FOREIGN PATENT DOCUMENTS

| JP | 5-235942 | 9/1993 |
| JP | 6-338891 | 12/1994 |

OTHER PUBLICATIONS

TCP/IP Illustrated vol. I, W. Richard Stevens, 1994, selected pages.*
RFC 1542, Wimer, 1993, Bootp.*
RFC 951, Croft et al., 1985, Bootp.*
RFC 1293, Bradley et al., 1992, IARP.*
Finlayson et al., "A Reverse Address Resolution Protocol", RFC 903, RFC Database, Jun. 1984.*

*Primary Examiner*—Hugh M. Jones
*Assistant Examiner*—W D Thomson
(74) *Attorney, Agent, or Firm*—Staas & Halsey LLP

(57) ABSTRACT

A network address supply system includes terminal equipments, a server, and a switching HUB to which the terminal equipments and the server are connected via communication lines. Each terminal equipment includes an address supply requesting unit. The switching HUB includes interfaces, a first line data storing unit, and a communication line control unit that when one of the interfaces receives an address supply request broadcast packet from one of the terminal equipments, transmits the address supply request broadcast packet to only an interface corresponding to the interface information stored in the first line data storing unit. The server includes a network address storing unit and an address supplying unit that when receiving the address supply request broadcast packet, broadcasts an address broadcast packet containing an unused network address stored in the network address storing unit as a response packet to the address supply request broadcast packet.

19 Claims, 32 Drawing Sheets

U.S. PATENT DOCUMENTS

| | | | |
|---|---|---|---|
| 5,287,103 A | * 2/1994 | Kasprzyk et al. | 340/825.52 |
| 5,309,437 A | * 5/1994 | Perlman et al. | 395/200.79 |
| 5,394,402 A | * 2/1995 | Ross | 370/402 |
| 5,420,862 A | * 5/1995 | Perlman | 370/401 |
| 5,421,024 A | * 5/1995 | Faulk et al. | 395/200.79 |
| 5,432,907 A | * 7/1995 | Picazo, Jr. et al. | 395/200.79 |
| 5,440,547 A | * 8/1995 | Easki et al. | 370/401 |
| 5,526,489 A | * 6/1996 | Nilakantan et al. | 395/200.75 |
| 5,548,729 A | * 8/1996 | Akiyoshi et al. | 395/200.75 |
| 5,550,816 A | * 8/1996 | Hardwick et al. | 370/397 |
| 5,566,170 A | * 10/1996 | Bakke et al. | 370/392 |
| 5,581,552 A | * 12/1996 | Civanlar et al. | 370/396 |
| 5,600,644 A | * 2/1997 | Chang et al. | 370/396 |
| 5,608,871 A | * 3/1997 | Murono | 395/200.79 |
| 5,633,865 A | * 5/1997 | Short | 370/412 |
| 5,636,216 A | * 6/1997 | Fox et al. | 370/402 |
| 5,706,440 A | * 1/1998 | Compliment et al. | 395/200.54 |
| 5,724,507 A | * 3/1998 | Iwatsuki et al. | 395/200.79 |
| 5,732,080 A | * 3/1998 | Ferguson et al. | 370/392 |
| 5,737,525 A | * 4/1998 | Picazo, Jr. et al. | 709/249 X |
| 5,742,760 A | * 4/1998 | Picazo, Jr. et al. | 395/200.79 |
| 5,745,699 A | * 4/1998 | Lynn et al. | 395/200.75 |
| 5,790,554 A | * 8/1998 | Pitcher et al. | 370/471 |
| 5,793,981 A | * 8/1998 | Billings | 395/200.61 |
| 5,812,792 A | * 9/1998 | Haddock et al. | 395/200.79 |

* cited by examiner

NETWORK ADDRESS SUPPLY SYSTEM FOR TRANSMITTING AN ADDRESS SUPPLY REQUEST TO ONLY A SERVER

BACKGROUND OF THE INVENTION

1. Field of the Invention

The present invention relates to a network system and a line concentrator for constructing the network system, 2. Description of the Prior Art A shared media type of network has hitherto been adopted as a basic structure in a prior art network system, e.g., in a LAN (Local Area Network) system represented by Ethernet. That is, there is adopted a construction for receiving and transferring data by use of communication lines for connecting a plurality of terminal equipments to each other. Therefore, the terminal equipments connected to the same LAN share a bandwidth with each other. Accordingly, when a traffic volume increases, the bandwidths of the communication lines come to deficiency enough to cause such a case that the smooth transmission and receipt of the data might be hindered. One of countermeasures against this problem may be a network system using a line concentrator (e.g. switching HUB).

FIG. 31 is a block diagram illustrating a whole configuration of the network system employing a line concentrator 1. Referring to FIG. 31, a plurality of terminal equipments (hereinafter simply called "terminals") 2a–2d are connected via communication lines to the line concentrator 1. The data is transferred and received based on packet communications between the respective terminals 2a–2d. A packet used at this time is stored with a data-transmitted-side address and a data-transmitting-side address in addition to the data to be transmitted.

Therefore, the respective terminals 2a–2d have network addresses (IP addresses (Internet Protocol addresses): layer 3 addresses) of the respective terminals 2a–2d, and MAC (Media Access Control) addresses. Then, when one of the terminals 2a–2d transmits the data to other terminal, the transmitting terminal generates the packet. This packet is stored with the data-transmitted MAC address and the data-transmitting network address, and the data.

On the other hand, the line concentrator 1 incorporates, as illustrated in FIG. 31, a MAC address table 3 stored with the MAC addresses of the terminals 2a–2d. When the line concentrator 1 receives the packet from one of the terminals 2a–2d, the data-transmitted MAC address stored in the packet is compared with the MAC address stored in the MAC address table 3, whereby the data-transmitted MAC address is confirmed, and the packet transmitting terminal and the packet transmitted terminal are brought into such a state as to be connected to each other via one communication line.

For example, referring again to FIG. 31, in the case of transmitting the data packet from the terminal 2a to the terminal 2c, when the line concentrator 1 receives the packet transmitted by the terminal 2a, the terminal 2a is connected via the one communication line to the terminal 2c with the MAC address of the terminal 2c that is stored in that packet (see the broken line in FIG. 31). This is known as a port switching function.

With this port switching function, a medium (communication line) is occupied between the terminal 2a and the terminal 2c, and, besides, the bandwidth is also occupied. Thus, the line concentrator 1 enables the terminals 2a–2d to transfer and receive the data through the one-to-one communication. Hence, the data can be smoothly transferred and received.

In contrast with this, there must be a case wherein each of the terminals 2a–2d transmits the data to the plurality of terminals. In this case, each of the terminals 2a–2d is stored with an address (a broadcast address) purporting that the packet should be transmitted to all the terminals, in an area for storing the packet data-transmitted MAC address. The packet stored with the broadcast designation as the transmitted address is termed a broadcast packet.

This broadcast packet is, when received in the line concentrator 1, transmitted to the plurality of terminals in accordance with setting of the line concentrator 1. More specifically, the line concentrator 1 is capable of unifying the plurality of communication lines (an interface accommodating the communication lines) connected to itself by setting, into a single or a plurality of groups. The line concentrator 1, upon receiving the broadcast packet, distinguishes which group the communication line accepting the transmission of the broadcast packet belongs to, and sends the broadcast packet to the communication line belonging to that group. Herein, a group having such a domain that the line concentrator 1 transmits the broadcast packet is referred to as a broadcast domain.

For example, as shown in a block diagram of FIG. 32, if all the communication lines connected to the line concentrator 1 are set as one broadcast domain, and when the line concentrator 1 receives the broadcast packet transmitted from, e.g., the terminal 2a, the communication lines for connecting the terminals 2a–2d to the line concentrator 1 are connected to each other (see the broken line in FIG. 32), and the broadcast packet is thereby transmitted from the line concentrator 1 to the terminals 2b–2d.

By the way, as illustrated in FIG. 33, there may be a case where a terminal 2e is newly connected via the communication line to the line concentrator 1 in the network system shown in FIG. 31. The terminal 2e immediately after being connected is in such a state as to possess the network address at all.

In anticipation of such a case, as illustrated in FIG. 33, an address possession server 4 (hereinafter simply termed a "server") is connected via the communication line to the line concentrator 1 in the network system. Herein, the server 4 possesses a self network address (hereinafter called a "server address") and a single or a plurality of an unused network address. This server 4, upon receiving a supply request of the network address from the terminal, supplies the unused network address possessed by the server 4 itself.

Given hereinbelow is an explanation of a process when the server supplies the network address to the terminal 2e in FIG. 33. A premise is that the line concentrator 1 is set to transmit, upon receiving the broadcast packet, this broadcast packet to all the terminals 2a–2e and the server 4 that are connected to the line concentrator 1.

At first, the terminal 2e transmits a broadcast packet ("address possession server_DISCOVER packet" hereinafter called a "DISCOVER packet") in which the data is a supply request for the server address and the unused network address. The reason why the "DISCOVER packet" is defined as the broadcast packet is that the terminal 2e immediately after being connected to the network system is in such a state that a position (address) of the server 4 is unknown. The terminals 2a–2d and the server 4 receive this "DISCOVER packet" via the line concentrator 1.

Next, when the server 4 receives the "DISCOVER packet", there is transmitted a broadcast packet ("address possession server_"OFFER packet": hereinafter called an "OFFER packet") in which the data consists of the server address of the server 4 and a single or a plurality of unused network addresses. The reason why the "OFFER packet" is defined as the broadcast packet is that the terminal 2e is in such a state as to have no self address, and therefore the server 4 is impossible of specifying the terminal to which the "OFFER packet" should be transmitted from the "DISCOVER packet". The terminals 2a–2e receive this "OFFER packet" via the line concentrator 1.

Next, when the terminal 2e receives the "OFFER packet", the terminal 2e selectively obtains one network address from the single or the plurality of unused network addresses, and a broadcast packet ("address possession server_REQUEST packet": hereinafter called a "REQUEST packet) in which the obtained result serves as a piece of data, is transmitted. This "REQUEST packet" is, as in the case of the "DISCOVER packet", transmitted via the line concentrator 1 to the terminals 2a–2d and the server 4.

Next, the server 4, upon receiving the "REQUEST packet", analyzes a content of the "REQUEST packet" and grasps which network address the terminal 2e obtained. Thereupon, the server 4 transmits a broadcast packet ("address possession server_ACK packet": hereinafter called an "ACK packet") in which the data is an acceptance acknowledgement of a result of the terminal 2e having obtained the network address. This "ACK packet" is received by the terminals 2a–2e via the line concentrator 1.

If a plurality of network systems shown in FIG. 31 are provided, as illustrated in, e.g., FIG. 34, the respective line concentrators 1a, 1b are connected to routers 30 via the communication lines in each network system. Then, the network system as shown in FIG. 31 constitutes a segment.

The relay system 30 incorporates a so-called "routing agent function". With this routing agent function", the relay system 30, when receiving the packet from one of the line concentrators 1a, 1b, transmits the packet to the other line concentrator 1a or 1b without any change in terms of content of the same packet.

For instance, referring to FIG. 34, if the terminal 2e immediately after being connected to the line concentrator 1a transmits the above "DISCOVER packet" to the server 4a and the server 4b as well, the "DISCOVER packet" is, when received by the line concentrator 1a, transmitted to all the communication lines connected to this line concentrator 1a. The "DISCOVER packet" is thereby transmitted to the server 3a and the terminals 2a, 2b, and also transmitted to the relay system 30 via the communication line on a backbone side. The relay system 30, upon receiving the "DISCOVER packet", transmits the packet to the line concentrator 1b without changing the content of the "DISCOVER packet" by dint of the above "routing agent function". The "DISCOVER packet" is, when received by the line concentrator 1b, transmitted to all the communication lines connected to the line concentrator 1b. The "DISCOVER packet" is thereby received by the terminals 2c, 2d and the server 4b. The servers 4a, 4b are thus notified of the network address supply request of the terminal 2e, and subsequently the above-mentioned process is executed, whereby the terminal 2e obtains the self network address.

There arise, however, the following problems inherent in the prior art network system described above. That is, in the network system shown in FIG. 34, the packet switching for obtaining the network address is all performed by use of, as explained above, the broadcast packet between the terminal 2e and the server 4.

Accordingly, in the line concentrator 1, the terminals 2a–2e and the server 4 are connected to each other via the communication lines in order to transmit the broadcast packets to all the broadcast domains, and it follows that the packets such as the "DISCOVER packet" and the "OFFER packet" are transmitted to the terminals 2a–2d requiring no receipt of these packets. Consequently, the bandwidth shrinks, and the throughput decreases. Particularly when the data are transferred and received between the terminals enough to require a considerable network performance as in a file transfer, etc., there must be a large influence due to the reduction in the bandwidth. As explained above, a first problem is that smoothing of the data communications between the terminals is hindered.

By the way, the terminals 2a–2e in the network system shown in FIG. 34, if not possessed of the network address and the MAC address, are incapable of performing the communications between the terminals based on the one-to-one communication. Accordingly, the terminal 2e illustrated in FIG. 34 is still in such a state as to be incapable of performing the one-to-one communication with other terminals 2a–2d simply by obtaining the network address from the server 4.

For this reason, if the terminal 2e shown in FIG. 34 tries to transmit the data to, e.g., the terminal 2d, the terminals 2e must obtain the MAC address of the terminal 2d through ARP (Address Resolution Protocol). More specifically, the terminal 2e transmits an ARP packet (ARP request packet) to the terminal 2d and, at the same time, receives an ARP (ARP response packet) from the terminal 2d. The ARP request packet is, however, also defined as a broadcast packet. Hence, the first problem described above arises.

Further, the relay system 30, upon receiving the broadcast packet, transmits the broadcast packet to all the line concentrators connected to the router itself through the "routing agent function". It might be probable that the bandwidth is reduced, and the throughput decreases. Thus, even if each of the line concentrators 1a–1c incorporates the function to occupy the bandwidth of the communication line, there exists a second problem in which the data are not smoothly transferred and received between the segments in the case of the relay system 30 incorporating no function to occupy the bandwidth of the communication line.

Moreover, if the plurality of relay systems are employed in the network system, it may happen that the router transmits a control broadcast packet (e.g., RIP (Routing Information Protocol), etc. (hereinafter termed an "internal control packet") for controlling other routers and the line concentrators. In this case, it follows that the internal control packet is transmitted to each broadcast domain via each of the line concentrators 1a–1c. The internal control packet is, however, unnecessary for the respective terminals 2a–2e, whereby the above first problems is caused. Further, the internal control packet might contain confidential items of data such as basic construction data of the network system, and therefore a second problem arises, wherein the security of the network may be spoiled.

SUMMARY OF THE INVENTION

It is a first object of the present invention, which was contrived in view of the first and second problems given above, to provide a network system and a line concentrator that are capable of smoothly transferring and receiving by preventing a decreases in throughput due to a reduction in bandwidths.

It is a second object of the present invention, which was contrived in view of the third problem given above, to provide a network system and a line concentrator that are capable of keeping a confidentiality of information.

The following is a first construction of the network system of the present invention, which was contrived to obviate the problems described above. That is, a network system according to the present invention comprises a plurality of terminal equipments, a server, and a line concentrator to which the plurality of terminal equipments and the address possession server are connected via communication lines. The terminal equipment includes an address supply requesting element for, when possessing no self network address, transmitting an address supply request broadcast packet to the line concentrator. The line concentrator includes a plurality of interfaces, a first line data storing element for storing data about the interface receiving the address broadcast packet transmitted from the server, and a communication line control element for, when one of the plurality of interfaces receives the address supply request broadcast packet from one of the plurality of terminal equipments, reading the data about the interface receiving the address broadcast packet from the first line data memory storing element, and then transmitting the address supply request broadcast packet from only the relevant interface. The server includes a network address storing element for storing an unused network address in the network system, and an address supplying element for, when receiving the address supply request broadcast packet, transmitting the address broadcast packet containing the unused network address stored in the network address storing element.

The line concentrator may further include an address requesting element for generating the address supply request broadcast packet and transmitting the same packet to the server. The first line data storing element is thereby stored with the data about the interface receiving the address broadcast packet transmitted by the server in response to the address supply request broadcast packet. As a matter of course, the data about the interface may be inputted to the first line data storing element from outside. Further, the line concentrator may include a second line data storing element for, when one of the plurality of interfaces receives the address supply request broadcast packet, storing data about the interface receiving the address supply request broadcast packet. The communication line control element of the line concentrator, when one of the plurality of interfaces receives the address broadcast packet from the server, may read the data about the interface receiving the address supply request broadcast packet stored in the second line data storing element, and may transmit the address broadcast packet from only the relevant interface. Moreover, the line concentrator may further comprise a fiducial traffic volume memory table stored with a fiducial traffic volume, and a traffic measuring element for measuring a traffic volume per unit time and comparing this measured result with the fiducial traffic volume. The address requesting element, when the traffic measuring element detects a traffic volume less than the fiducial traffic volume, may generate the address supply request broadcast packet, and may transmit the same packet to the server. Furthermore, the line concentrator may further comprise a timer for measuring a predetermined time. The traffic measuring element may measure a traffic volume per unit time when the timer measures the predetermined time, and may compare this measured result with the fiducial traffic volume. In addition, the line concentrator may further comprise a procedure stopping element for generating a procedure stop broadcast packet for stopping packet switching for obtaining the unused broadcast packet between the plurality of terminal equipments and the server, and transmitting the same packet to the server.

According to a first construction of the network system of the present invention, the network address storing element of the server is stored with a network address of the server itself, and the address supplying element of the server, when receiving the address request broadcast packet, transmits an address broadcast packet containing the unused network address stored in the network address storing element and the network address of the server itself. In this case, the line concentrator may include an address storing element for storing the network address of the server itself, an address managing element for, when one of the plurality of interfaces receives the address supply request broadcast packet from one of the plurality of terminal equipments, reads the network address of the server itself that is stored in the address storing element, and a packet generating element for generating the address supply request packet in which a packet-transmitted address of the address supply request broadcast packet received by one of the plurality of interfaces is changed into the network address of the server itself that is read by the address managing element, and for transmitting the same packet to the server.

Further, the network address of the server itself may be inputted to the address storing element from outside, and, when the line concentrator receives the address broadcast packet, the address managing element may store the address storing element with the network address of the server itself that is contained in the address broadcast packet.

According to a second construction of the network system of the present invention, a network system comprises a plurality of terminal equipments, a plurality of line concentrators to which the plurality of terminal equipments are connected via communication lines, and a relay system to which the plurality of line concentrators are connected via the communication lines. The relay system includes a control packet transmitting element for transmitting a control broadcast packet of the relay system itself and/or the plurality of line concentrators. Each of the line concentrator includes a plurality of interfaces, a packet distinguishing element for, when one of the plurality of interfaces receives the packet from the relay system, determining whether or not the packet received from the relay system is the control broadcast packet, and a communication line control element for, when the packet distinguishing element determines that the packet received from the relay system is the control broadcast packet, making the control broadcast packet untransmissible from the plurality of interfaces.

According to a third construction of the network. system of the present invention, a network system comprises a plurality of terminal equipments, a plurality of first line concentrators to which the plurality of terminal equipments are connected via communication lines, and a second line concentrator to which the first line concentrators are connected via the communication lines. The plurality of terminal equipments include ARP requesting elements for, when having no data-transmitted MAC (Media Access Control) address, transmitting ARP (Address Resolution Protocol) request packets containing data-transmitted network addresses of the first line concentrators. The plurality of first line concentrators include first address converting elements for, when receiving the ARP request packet from one of the plurality of terminal equipments, transmitting, to the second line concentrators, the ARP request packet in which the packet-transmitted address of the received ARP request packet is converted into the address of the second line concentrator. The second line concentrator include a first address corresponding table stored with the network address in the network system in such a form as to correspond to the MAC address, and a responding element for, when receiving the ARP request packet from one of the plurality of first line concentrators, reading from the first address corresponding table the data-transmitted MAC address corresponding to the data-transmitted network address contained in the ARP request packet, for generating an ARP response packet containing the data-transmitted MAC address, and for transmitting the ARP response packet to the first line concentrator transmitting the ARP request packet.

According to a fourth construction of the network system of the present invention, a network system comprises a plurality of terminal equipments, a plurality of first line concentrators to which the plurality of terminal equipments are connected via communication lines, and a second line concentrator to which the first line concentrators are connected via the communication lines. The plurality of terminal equipments include ARP requesting elements for, when having no data-transmitted MAC (Media Access Control) addresses, transmitting ARP (Address Resolution Protocol) request packets containing data-transmitted network addresses of the first line concentrators. The plurality of first line concentrators include first address converting elements for, when receiving the ARP request packet from one of the plurality of terminal equipments, transmitting, to the second line concentrators, the ARP request packet in which the packet-transmitted address of the received ARP request packet is converted into the address of the second line concentrator, and a second address converting element for, when receiving the ARP request packet from the second line concentrator, transmitting to the plurality of terminal equipments the ARP request packet in which the packet-transmitted address of the ARP packet is converted into a broadcast designation. The second line concentrator includes a second address corresponding table stored with the network addresses in the network system in such a form as to correspond to the MAC addresses of the plurality of first line concentrators, and a third address converting element for, when receiving the ARP request packet from one of the plurality of first line concentrators, reading from the second address corresponding table the MAC address of the first line concentrator that corresponds to the data-transmitted network address contained in the ARP request packet, for generating an ARP request packet in which the MAC address of the first line concentrators serves as transmission destination addresses, and for transmitting the ARP request packets to the relevant first line concentrators.

According to the third and fourth constructions of the network system of the present invention, a network system may comprise a plurality of terminal equipments, a plurality of first line concentrators to which the plurality of terminal equipments are connected via communication lines, a second line concentrator to which the first line concentrators are connected via the communication lines, and an address resolution server to which the second line concentrator is connected via the communication line.

According to the network system of the present invention, it is possible to prevent a throughput from being decreased due to a reduction in terms of bandwidths for the communication lines for connecting the plurality of terminal equipments, the server and the line concentrator and also to properly transmit the data between the terminal equipments.

Further, in such a case that the network system is equipped with the relay system, the control broadcast packet is inhibited from being transmitted to the terminal equipments by providing the line concentrator with a packet distinguishing element. Therefore, the confidentiality of the data contained in the control broadcast packet can be kept, and, in turn, the confidentiality of information in the network system can be also held.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Specific embodiments of a network system and a line concentrator according to the present invention will hereinafter be described.

<Embodiment 1>

Figure 1:
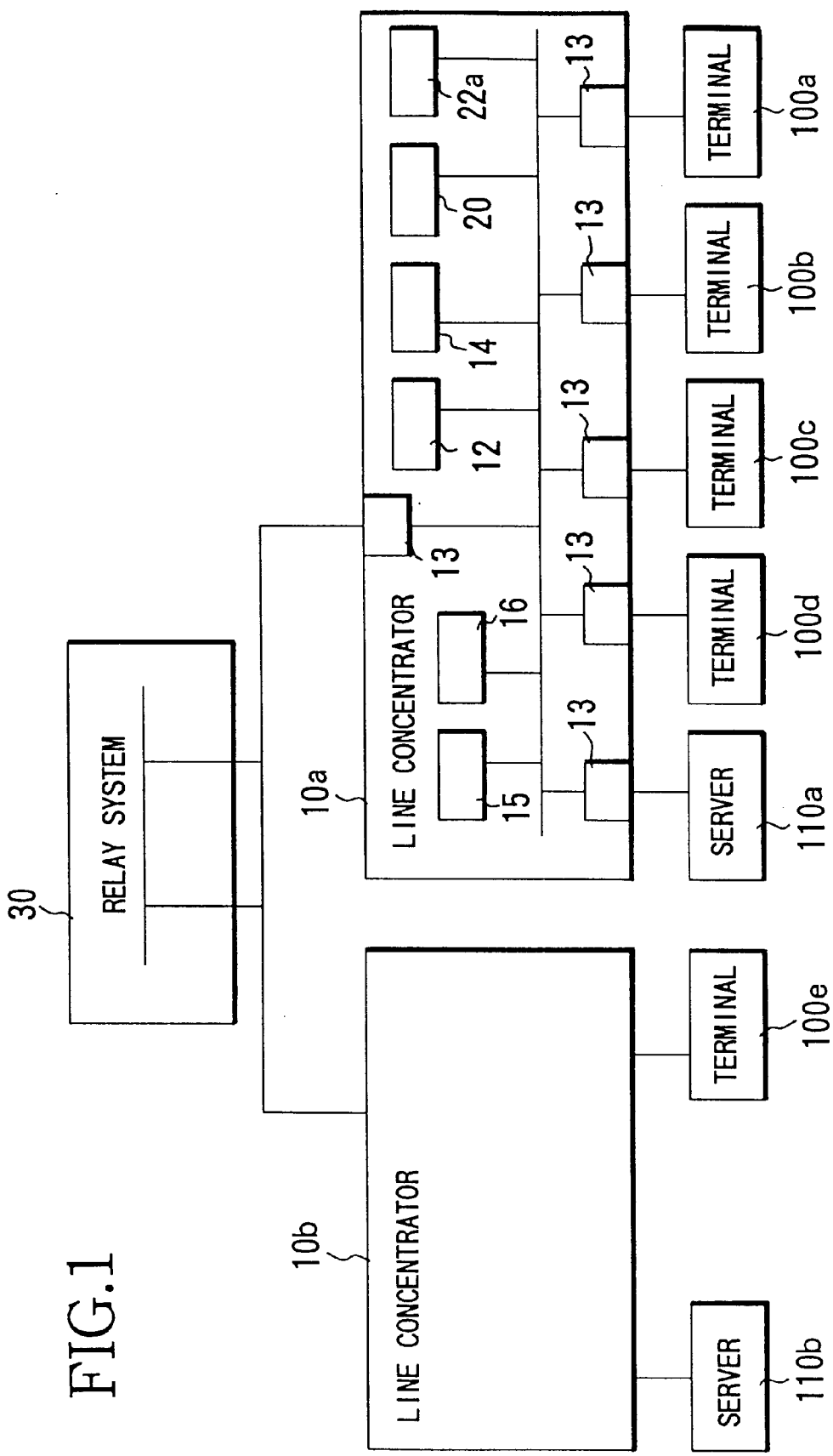
FIG. 1 is a block diagram illustrating a whole construction of a network system in accordance with an embodiment 1 of the present invention.

At first, an embodiment 1 of the network system will be discussed. FIG. 1 is a block diagram showing the network system in accordance with the embodiment 1. In the embodiment 1, the network system is a LAN system (Ethernet). The present network system is constructed of five sets of terminal equipments (hereinafter simply called "terminals") 100a–100e, two sets of address possession servers (hereinafter simply termed "servers") 110a, 110b, two sets of line concentrators 10a, 10b, and a relay system 30. The terminals 100a–100d and the server 110a are connected via communication lines to the line concentrator 10a. Further, the terminal 100e and the server 110b are connected via the communication lines to the line concentrator 10b.

Figure 2:
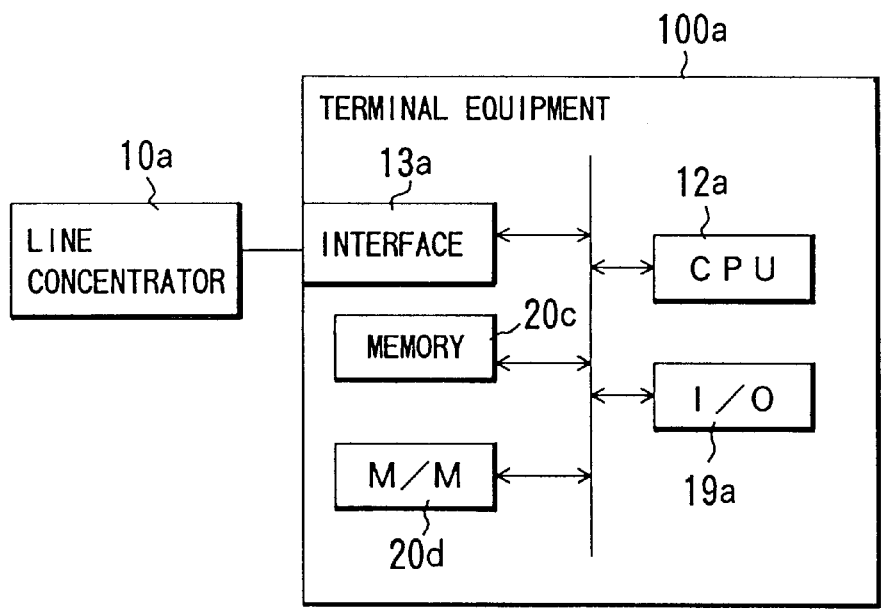
FIG. 2 is a block diagram showing a construction of a terminal equipment shown in FIG. 1.

The plurality of terminals 100a–100e have the same construction. Herein, the terminal 100a will be exemplified with reference to FIG. 2. Each of the terminals 100a–100e is defined as a computer consisting of a CPU (Central Processing Unit) 12a, a main memory 20d, a memory device 20c stored with a control program such as an application program, an I/O (Input/Output unit) 19a, and an interface 13a. The terminal equipments 100a–10e receive the data through packet communications. A network address (IP address: layer 3 address) and a MAC address (layer 2 address) are needed for performing a one-to-one communication between the terminals. For this purpose, the memory device 20c of each of the terminals 100a–100c and 100e is stored with the network addresses and the MAC addresses of the terminals 100a–100c, 100e and the servers 110a, 110b. In contrast with this, the terminal 100d is in a state immediately after being connected to the present network, and the memory device (unillustrated) thereof is stored with the network address at all.

Further, each of the terminals 100a–100e, when transmitting the data to other terminals, down-loads the control program stored in the memory device 20c, into a main memory 20d, and the CPU 12a executes the program, thereby generating a packet. The packet generated at that time is stored with the data, a MAC address of a data-transmitted terminal, a MAC address of a data-transmitting terminal, a data-transmitted network address, and a data transmitting network address. Then, the thus generated packet is transmitted from the interface 13a to the line concentrators 10a, 10b.

Figure 3:
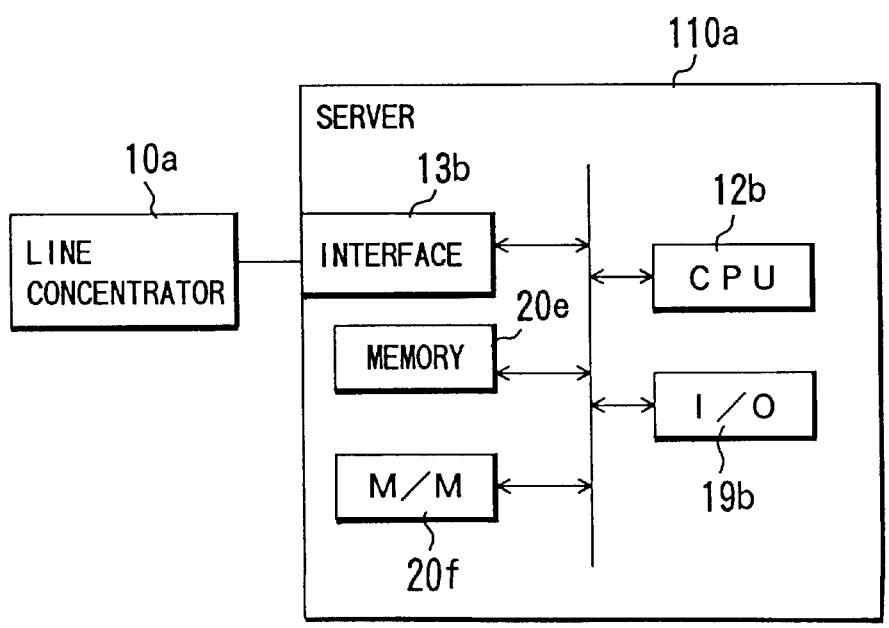
FIG. 3 is a block diagram showing a construction of an address possession server illustrated in FIG. 1.

Each of the servers 110a, 110b has the same construction. Herein, the server 110a will be exemplified with reference to FIG. 3. Each of the servers 110a, 110b is constructed of a CPU 12b, a main memory 20f, a memory device stored with the control programs and database, an I/O unit 19b, and an interface 13b. The memory device 20e of the server 110a is stored with a network address (hereinafter referred to as a "server address") of the server 110a itself and a plurality of unused network address. On the other hand, the memory device (unillustrated) of the server 110b is stored with the server address of the server 110b itself and the plurality of unused network addresses. Note that contents of the plurality of unused network addresses stored in the memory device 20e of the server 10a are different from contents of the plurality of unused network addresses stored in the memory device (unillustrated) of the server 110b. Each of the servers 110a, 110b supplies the server address and the unused network address to the terminal 100d in accordance with a request given from the terminal 100d. Note that the servers 110a, 110b may be used as file servers.

By the way, the terminal 100d is in the state immediately after being connected to the network as stated above. The terminal 100d in the present state is therefore incapable of performing the one-to-one communications to the terminals 100a–100c, 100e. For this reason, the terminal 100d transmits a broadcast packet (hereinafter called a "DISCOVER packet") of an "address possession server_DISCOVER request" defined as a message signal the content of which is a request for supplying the server address, to the servers 110a, 110b by executing the control program stored in the memory device 20c (corresponding to an address supply requesting element).

Further, the terminal 100d, after the terminals 100d itself has transmitted the "DISCOVER packet", receives the server addresses and the unused network addresses from the servers 110a, 110b. In this case, the terminal 100d selectively obtains one of the plurality of the received network addresses. Subsequently, the terminal 100d transmits a broadcast packet (hereinafter, termed a "REQUEST packet") of an "address possession server_REQUEST signal" defined as a message signal purporting that the network address is obtained.

Further, the terminal 100d transmits, in the case of ceasing the packet switching for obtaining the network addresses from the servers 110a, 110b, a broadcast packet (hereinafter, termed a "RELEASE packet") of an "address possession server_RELEASE request". Herein, the "RELEASE packet" is defined as a message signal purporting that the terminal 100d forcibly finishes the packet switching for obtaining the network address.

Further, each of the respective servers 110a, 110b, when receiving the "DISCOVER packet", transmits a broadcast packet (hereinafter called an "OFFER packet") of an "address possession server_OFFER signal" defined as a response signal containing the self server address and the plurality of unused network addresses by executing the control program stored in the memory device 20e (corresponding to an address supplying element).

Furthermore, each of the servers 110a, 110b, when receiving the "REQUEST packet", analyzes the "REQUEST packet" and distinguishes which network address of the servers 110, 110b. The server 110a or 110b, when determining that the network address transmitted the server itself is not selected, stops the operation.

Contrastingly, the server 110a or 10b, when determining that the network address transmitted the server itself is selected, specifies the selected network address. Then, each of the servers 110a or 110b, when specifying the selected network address, transmits a broadcast packet (hereinafter called an "ACK packet") of an "address possession server_ACK signal" defined as a response signal purporting that the selection thereof is acknowledged.

Figure 4:
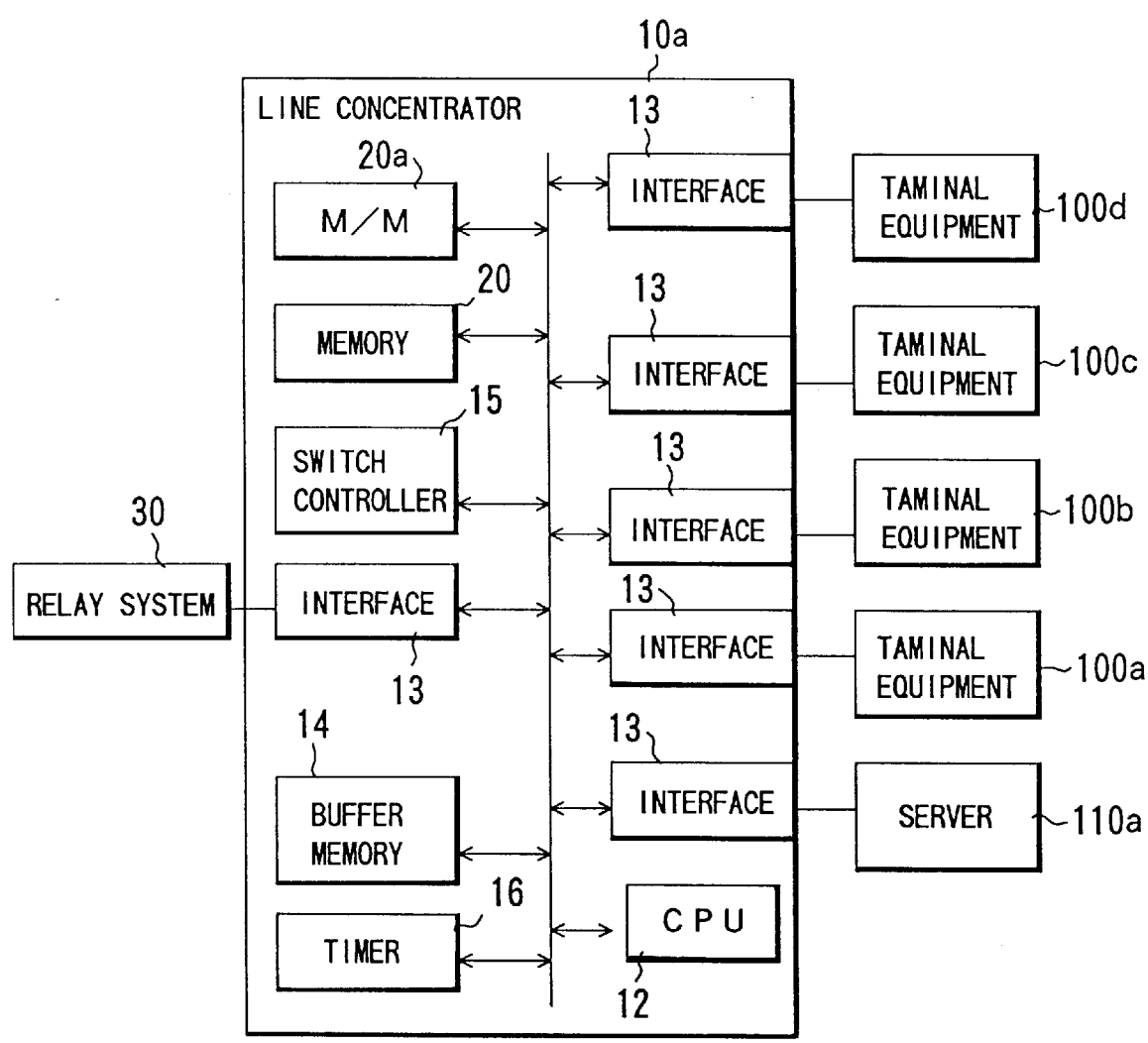
FIG. 4 is a block diagram showing a construction of a line concentrator shown in FIG. 1.

Next, a hardware architecture of the line concentrators 10a, 10b in accordance with the embodiment 1 will be explained with reference to a block diagram of FIG. 4. The line concentrator 10a has the same construction as that of the line concentrator 10b, and therefore the line concentrator 10a will be shown in FIG. 4 by way of an exemplification. The line concentrator 10a is constructed of a CPU 12, a plurality of interfaces 13, a buffer memory 14, a switch controller 15, a timer 16, a memory device 20, and a main memory 20a. Herein, the memory device 20 is stored with control programs such as an application program and a database. The CPU 12 executes the control programs stored in the memory device 20. Further, the buffer memory 14 temporarily accumulates the packets received from the terminals 100a–100e and the servers 110a, 110b. The line concentrators 10a, 10b adopt a store & forward method of temporarily accumulating the received packets in the buffer memory 14 and analyzing contents of the data contained in the packets.

Further, the pulurality of interfaces 13 are so-called port. The plurality of interfaces 13 are provided in the line concentrator 10a, and inherent numbers are allocated to the individual interfaces. The respective interfaces 13 accommodate the communication lines connected to the terminals 100a–100d, the server 110a and the relay system 30. Each interface 13 receives the packets transmitted from the terminals 100a–100d is provided with an unillustrated switch for turning ON/OFF a transmissions tate of the communication line accommodated therein. Further, the switch controller 15 controls ON/OFF states of the unillustrated switch provided in each of the interfaces 13.

Next, the memory device 20 of the line concentrator 10a will be explained with reference to a block diagram of FIG. 5. The memory device 20 is stored with a packet distinguishing function 21 (corresponding to a packet distinguishing element), an address requesting function 22 (corresponding to an address requesting element), a communication line control function 60 (corresponding to a communication line control element), a traffic volume measuring function 25 (corresponding to a traffic volume measuring element), and a procedure stopping function 31 (corresponding to a procedure stopping element). These functions are, as a matter of fact, defined as control programs stored in the memory device 20 and therefore functions actualized by the CPU 12 executing these control programs down-loaded into the main memory 20a. Further, the memory device 20 is also stored with a fiducial traffic volume memory table 26, a first line data memory table 24a (corresponding to a first line data storing element), and a second line data memory table 24b (corresponding to a second line data storing element).

Herein, the first line data memory table 24a is stored with inherent numbers of the interfaces 13 receiving the "OFFER packet". Further, the second line data memory table 24b is stored with inherent numbers of the interfaces 13 receiving the "DISCOVER packet".

Moreover, the packet distinguishing function 21, when the packets are accumulated in the buffer memory 14 (see FIG. 4) of the line concentrator 10a, obtains the inherent numbers of the interfaces 13 receiving those packets. Further, the packet distinguishing function 21 distinguishes whether or not the packets accumulated in the buffer memory 14 are the broadcast packets. If defined as the broadcast packets, the packet distinguishing function 21 analyzes contents thereof. More specifically, the packet distinguishing function 21 distinguishes whether or not the broadcast packets accumulated in the buffer memory 14 are packets (hereinafter termed "address supply packets") replaced when the terminal 100d of the "DISCOVER packet" receives the supply of the network addresses from the servers 110a, 110b. Then, when determining that the above packets are defined as the address supply packets, the packet distinguishing function 21 notifies the communication line control function 60 and/or the procedure stopping function 31 of contents of the address supply packet and a port number (hereinafter called "packet data")n in accordance with the content of the packet.

To be more specific, if the address supply packet is defined as the "DISCOVER packet", the packet distinguishing function 21 notifies the communication line control function 60 of the packet data about the "DISCOVER packet". Further, if the address supply packet is defined as the "OFFER packet", the packet distinguishing function 21 notifies the communication line control function 60 and the procedure stopping function 31 of the packet data about the "OFFER packet". Furthermore, if the address supply packet is defined as the "REQUEST packet", the packet distinguishing function 21 notifies the communication line control function 60 of the packet data about the "REQUEST packet". Further, if the address control packet is defined as the "ACK packet", the packet distinguishing function 21 notifies the communication line control function 60 of the packet data about the "ACK packet".

On the other hand, the packet distinguishing function 21, when receiving the packet from the relay system 30, also distinguishes whether or not this packet is a packet (hereinafter termed an "internal control packet") for controlling the relay system 30 and the line concentrators 10a, 10b. Then, the packet distinguishing function 21, when determining that the packet is defined as the internal control packet, notifies the communication line control function 60 of such a purport that the same packet is the internal control packet.

Note that if the packet distinguishing function 21 determines that the packets accumulated in the buffer memory 14 are normal data packets, a normal process is executed in the interior of the line concentrator 21.

The communication line control function 60, upon receiving the packet data or a purport of being the internal control packet, writes and reads communication line data to and from the first line data memory table 24a or the second line data memory table 24b based on these items of data. Furthermore, the communication line control function 60 supplies a control signal to the switch controller 15 shown in FIG. 4, thereby turning ON/OFF an unillustrated switch of each interfaces 13. Herein, the first line data memory table 24a is stored with the inherent numbers of the interfaces 13 receiving the "OFFER packet". Further, the second line data memory table 24b is stored with the inherent numbers of the interfaces 13 receiving the "DISCOVER packet".

More specifically, the communication line control function 60, when receiving the packet data relative to the "DISCOVER packet" from the packet distinguishing function 21, writes the inherent number obtained from the packet data to the second line data memory table 24b. Further, the communication line control function 60, when receiving the packet data relative to the "OFFER packet" from the packet distinguishing function 21, writes the inherent number obtained from the packet data to the first line data memory table 24a. At this time, the communication line control function 60 retrieves inside the second line data memory table 24b and, if stored with the inherent number of the interface 13 receiving the "DISCOVER packet", reads this inherent number. Based on this inherent number, the communication line control function 60 generates the control signal for turning ON the unillustrated switch of each interfaces 13 and supplies this control signal to the switch controller 15 (see FIG. 4). Further, the communication line control function 60, when receiving the packet data relative to the "REQUEST packet" from the packet distinguishing function 21, reads the inherent number of the interface 13 that is stored in the first line data memory table 24a. Based on this inherent number, the communication line control function 60 generates the control signal for turning ON the unillustrated switch of each interfaces 13 and supplies this control signal to the switch controller 15. Further, the communication line control function 60, when receiving the packet data about the "ACK packet" from the packet distinguishing function 21, retrieves inside the second line data memory table 24b and, if stored with the inherent number of the interface 13 receiving the "REQUEST packet", reads this inherent number. Based on this inherent number, the communication line control function 60 generates the control signal for turning ON the unillustrated switch of each interface 13 and supplies this control signal to the switch controller 15.

The address requesting function 22 generates and transmits the "DISCOVER packet" in place of the terminal 10d. Accordingly, in the network system shown in FIG. 1, the "DISCOVER packet" transmitted by one of the line concentrators 10a, 10b is broadcasted, and the "OFFER packet" responding to this "DISCOVER packet" is received by predetermined interfaces 13 of the line concentrators 10a, 10b. Each of the line concentrators 10a, 10b is thereby capable of knowing positions (interfaces 13 for receiving the packets transmitted by the servers 110a, 110b) of the servers 110a, 110b. Thus, the respective line concentrators 10a, 10b makes use of the "DISCOVER packets" as tools for detecting the positions of the servers 110a, 110b.

Note that the address requesting function 22, when the address requesting function 22 itself transmits the "DISCOVER packet", notifies the procedure stopping function 31 of this purport. Furthermore, the address requesting function 22 is actuated upon switching ON power supplies of the line concentrators 10a, 10b.

The procedure stopping function 31 generates a "RELEASE packet". More specifically, the procedure stopping function 31, upon receiving the packet data about the "OFFER packet", checks whether or not the address requesting function 22 gives a notification purporting that the "DISCOVER packet" has been transmitted. Then, when determining that the address requesting function 22 gives the notification, the "RELEASE packet" is transmitted to the terminals 100a–100e. Whereas if the determination is that the address requesting function 22 gives no notification, the procedure stopping function 31 stops the operation. The procedure stopping function 31, in the network system illustrated in FIG. 1, enables the line concentrators 10a, 10b to forcibly finish the packet switching for obtaining the network addresses between the terminal 100d and the servers 110a, 110b.

The traffic volume measuring function 25 measures traffic volumes between the line concentrators 10a, 10b and the terminal equipments 100a–10e. Specifically, the traffic volume measuring function 25 has an unillustrated counter and detects the traffic volume by measuring the number of accumulated packets per hour with respect to the packets accumulated in the buffer memory 14 (see FIG. 4).

Further, the traffic volume measuring function 25, after measuring the traffic volume, reads the fiducial traffic volume stored in the fiducial traffic volume memory table 26 and compares these traffic volumes with each other. Then, if the measured traffic volume is under the fiducial traffic volume, the traffic volume measuring function 25 issues, to the address requesting function 22, a command purporting that the "DISCOVER packet" is transmitted. Further, the traffic volume measuring function 25 operates each time the timer 16 shown in FIG. 4 counts a predetermined time. As a matter of course, the traffic volume measuring function 25 may be structured to detect the traffic volume by measuring the number of packets received by the respective interfaces 13. This traffic volume measuring function 25 makes the address requesting function 22 transmit "DISCOVER packet" only when the individual line concentrators 10a, 10b are not busy in their processing.

Further, the memory device 20 of each of the line concentrators 10a, 10b is stored with a MAC address table (unillustrated) stored with the MAC addresses of the terminals 100a–100e. If the above packet distinguishing function 31 determines that the packets accumulated in the buffer memory 14 are the normal data packets, the packet transmitted MAC address within the packet is compared with the MAC address stored in the MAC address table. The destination to which the packet is transmitted is thereby confirmed. Then, the data packets accumulated in the buffer memory 14 are sent from the interface 13 connecting the line concentrator 10a, 10b itself to the packet transmission destination.

Note that each of the line concentrators 10a, 10b forms a broadcast domain in which all the interfaces 13 possessed by the line concentrator 10a, 10b itself are set into one group and, upon receiving the broadcast packet, the broadcast packets are sent from the interfaces 13 exclusive of this received broadcast packet.

The relay system 30 is constructed by use of a router and is connected via the communication lines to the respective line concentrators 10a, 10b. This relay system 30 incorporates a "routing agent function" to transmit, when receiving the packet from one of the line concentrators 10a, 10b, this packet to the other line concentrator. Further, the relay system 30 is constructed to transmit a control broadcast (internal control packet) for controlling the operations of the line concentrators 10a, 10b according to the necessity. Note that the relay system 30 may involve the use of a bridge and a repeater in place of the router.

Figure 6:
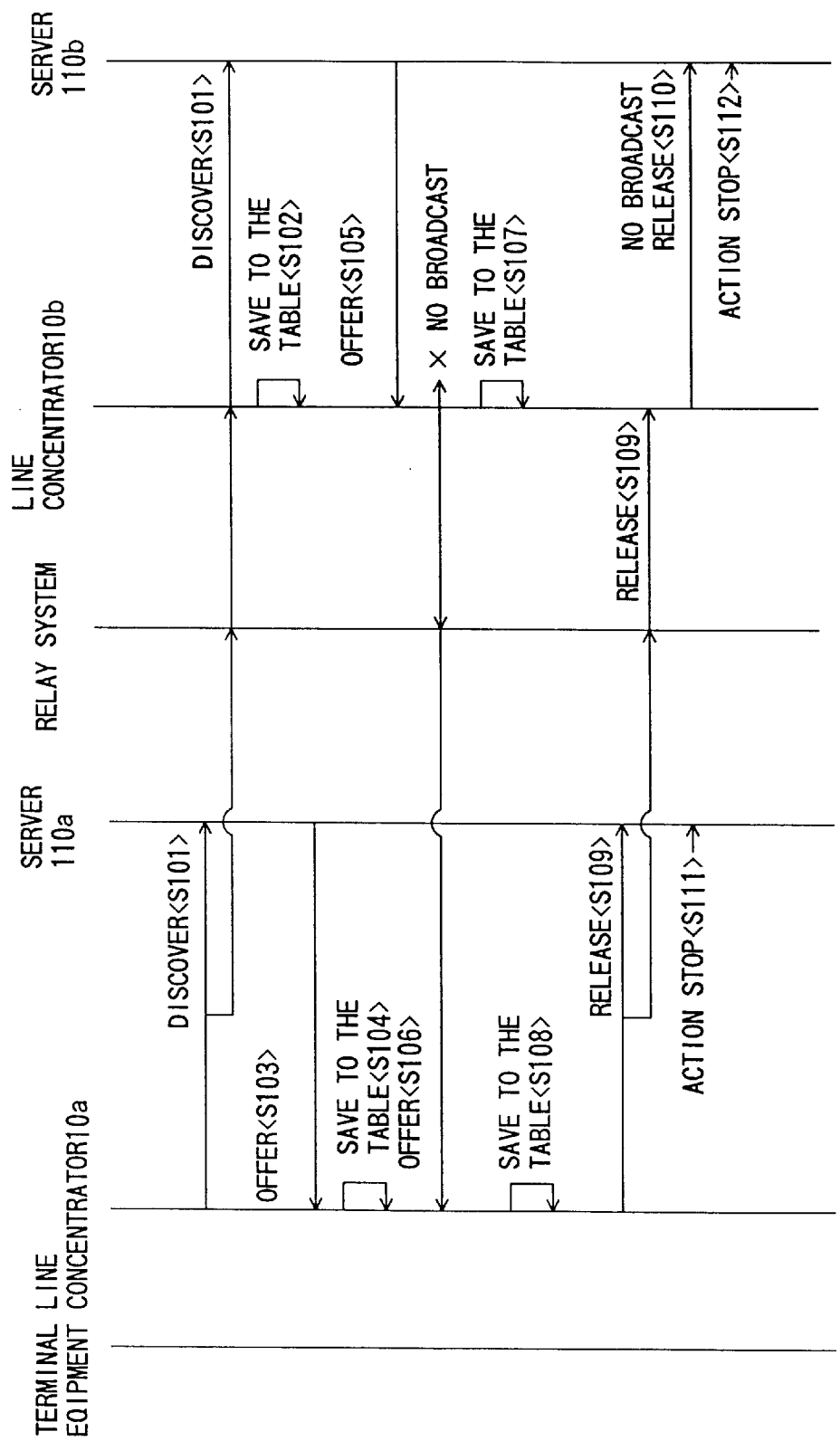
FIG. 6 is a sequence diagram showing packet switching in the network system shown in FIG. 1.

Given next is an explanation of the packet switching executed for the terminal 100d obtaining the network address the above network system. To begin with, the packet switching performed as pre-processing for the network system will be described with reference to a sequence diagram shown in FIG. 6. FIG. 6 illustrates the packet switching executed as the pre-processing by the line concentrator 10a by way of a premise that the line concentrator 10b is on the operation.

When switching ON the power supply of the line concentrator 10a illustrated in FIG. 1, the line concentrators 10a, 10b transmit the "DISCOVER packet" to the server 10a and, at the same time, transmit the "DISCOVER packet" to the server 10b via the relay system 30 and the line concentrator 10b <step S101>.

Figure 5:
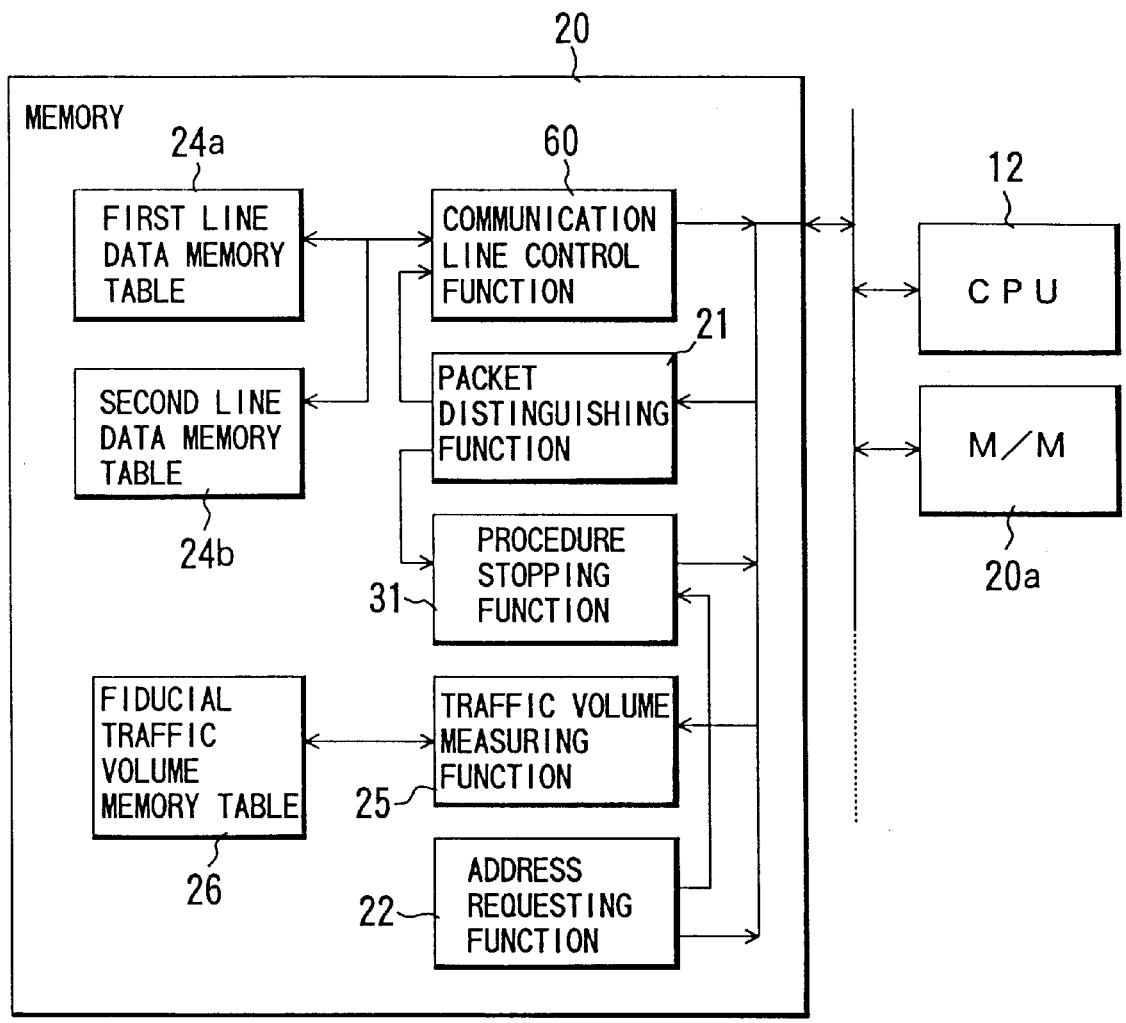
FIG. 5 is a block diagram illustrating a memory device of the line concentrator shown in FIG. 4.

At this time, a predetermined interface 13 of the line concentrator 10b receives the "DISCOVER packet", whereby the following processes are executed within the line concentrator 10*b* (see FIG. 5). That is, the "DISCOVER packet" is accumulated in the buffer memory 14 shown in FIG. 4. Thereupon, the packet distinguishing function 21 is actuated. The packet distinguishing function 21 obtains the inherent number of the interfaces 13 receiving the "DISCOVER packet" and analyzes a kind and a content of the packet, thus determining the packet accumulated in the buffer memory 14 as a "DISCOVER packet". Then, the packet distinguishing function 21 notifies the communication line control function 60 and the procedure stopping function 31 of the packet data. The communication line control function 60 stores the second line data memory table 24*b* with the inherent number contained in the packet data <step S102>.

The server 110*a*, upon receiving the "DISCOVER packet", generates the "OFFER packet" containing a self server address and a plurality of unused network addresses. This "OFFER packet" is transmitted to the line concentrator 10*a* <step S103>.

When the predetermined interface 13 of the line concentrator 10*a* receives the "OFFER packet" transmitted from the server 110*a*, the following processes are executed within the line concentrator 10*a* (see FIG. 5). That is, the "OFFER packet is accumulated in the buffer memory 14 of the line concentrator 10*a*, and the packet distinguishing function 21 obtains the inherent number of the interface 13 receiving the "OFFER packet and then determines the packet as the "OFFER packet. The packet distinguishing function 21 notifies the communication line control function 60 and the procedure stopping function 31 of the packet data having the above content. The communication line control function 60 is actuated upon receiving the notification of the packet data from the packet distinguishing function 21, and then stores the first line data memory table 24*a* with the inherent number of the interface 13 that is contained in the packet data <step S104>.

On the other hand, the server 110*b* also, upon receiving the "DISCOVER packet", similarly generates the "OFFER packet" containing a self server address and a plurality of unused network addresses. This "OFFER packet" is transmitted to the line concentrator 10*b* <step S105>.

When the interface 13 of the line concentrator 10*b* receives the "OFFER packet" transmitted from the server 110*b*, the following processes are executed within the line concentrator 10*b*. That is, the "OFFER packet is accumulated in the buffer memory 14, and the packet distinguishing function 21 obtains the inherent number of the interface 13 and then determines the packet as the "OFFER packet. The communication line control function 60 is notified of the packet data having the above content. The communication line control function 60 stores the first line data memory table 24*a* with the inherent number of the interface 13 that is contained in the packet data <step S106>.

Simultaneously with this operation, the communication line control function 60 reads the inherent number of the interface 13 that is stored in step S102, from the second line data memory table 24*b*. Subsequently, the communication line control function 60 generates the control signal for turning ON the unillustrated switch of the interface 13 corresponding to the thus read inherent number and supplies the switch controller 15 with this control signal (see FIG. 4). The switch controller 15 turns ON the unillustrated switch of each interface 13 based on the control signal received from the communication line control function 60. The communication line for connecting the line concentrator 10*b* to the relay system 30 among the plurality of communication lines connected to the line concentrator 10*b*, is thereby brought into a packet transmittable status. Accordingly, the "OFFER packet" is transmitted to only the relay system 30 without being broadcasted. Then, the "OFFER packet" is transmitted via the relay system 30 to the line concentrator 10*a* <step S107>.

When a predetermined interface 13 of the line concentrator 10*b* receives the "OFFER packet" transmitted from the server 110*b*, whereby the same processes as those executed in step S104 are executed within the line concentrator 10*b*. That is, the communication line control function 60 stores the first line data memory table 24*a* with the inherent number of the interface receiving the "OFFER packet" transmitted from the server 110*b* <step S108>.

Next, the procedure stopping function 31 of the line concentrator 10*a* is actuated. The procedure stopping function 31 generates the "RELEASE packet" on the premise that the address requesting function 22 gave the notification purporting that the "DISCOVER packet" has been transmitted, and then broadcasts this "RELEASE packet". The "RELEASE packet" is thereby transmitted to the server 110*a* and the relay system 30 <step S109>.

At this time, when the predetermined interface 13 of the line concentrator 10*b* receives the "RELEASE packet", the following processes are executed within the line concentrator 10*b*. That is, the "RELEASE packet" is accumulated in the buffer memory 14, and the packet distinguishing function 21 obtains the inherent number of the interface 13 and a content of the packet as well. Then, the packet distinguishing function 21 notifies the communication line control function 60 of the packet data having the above content. The communication line control function 60, when determining that the packet is the "RELEASE packet" from the packet data, reads the inherent number of the interface that is stored in step S106 from the first line data memory table 24*a*. Then, the communication line control function 60 generates the control signal for turning ON the unillustrated switch of the interface 13 corresponding to this inherent number, and supplies the switch controller 15 (see FIG. 4) with this control signal. The switch controller 15 turns ON the unillustrated switch of each interface 13 based on the control signal received from the communication line control function 60. The communication line for connecting the line concentrator 10*b* to the server 110*b* among the plurality of communication lines connected to the line concentrator 10*b*, is thereby brought into a packet transmittable status. Accordingly, the "RELEASE packet" is transmitted to only the server 110*b* without being broadcasted <step S110>.

Then, the server 110*a*, upon receiving the "RELEASE packet", forcibly finishes the packet switching of the address request packet <step S111>. Further, the server 110*b* also, upon receiving the "RELEASE packet", forcibly finishes the packet switching of the address request packet <step S112>. Thus, the pre-processing of the line concentrator 10*a* is ended. Note that even when switching ON the power supply of the line concentrator 10*b* during the operation of the line concentrator 10*a*, the same packet switching as in step S112 is carried out from step S101 onward.

In this manner, each of the line concentrators 10*a*, 10*b* transmits the. "DISCOVER packet" by itself and thereby memorizes positions (inherent numbers of the interface 13 receiving the "OFFER packet") of the respective servers 110*a*, 110*b*.

Figure 7:
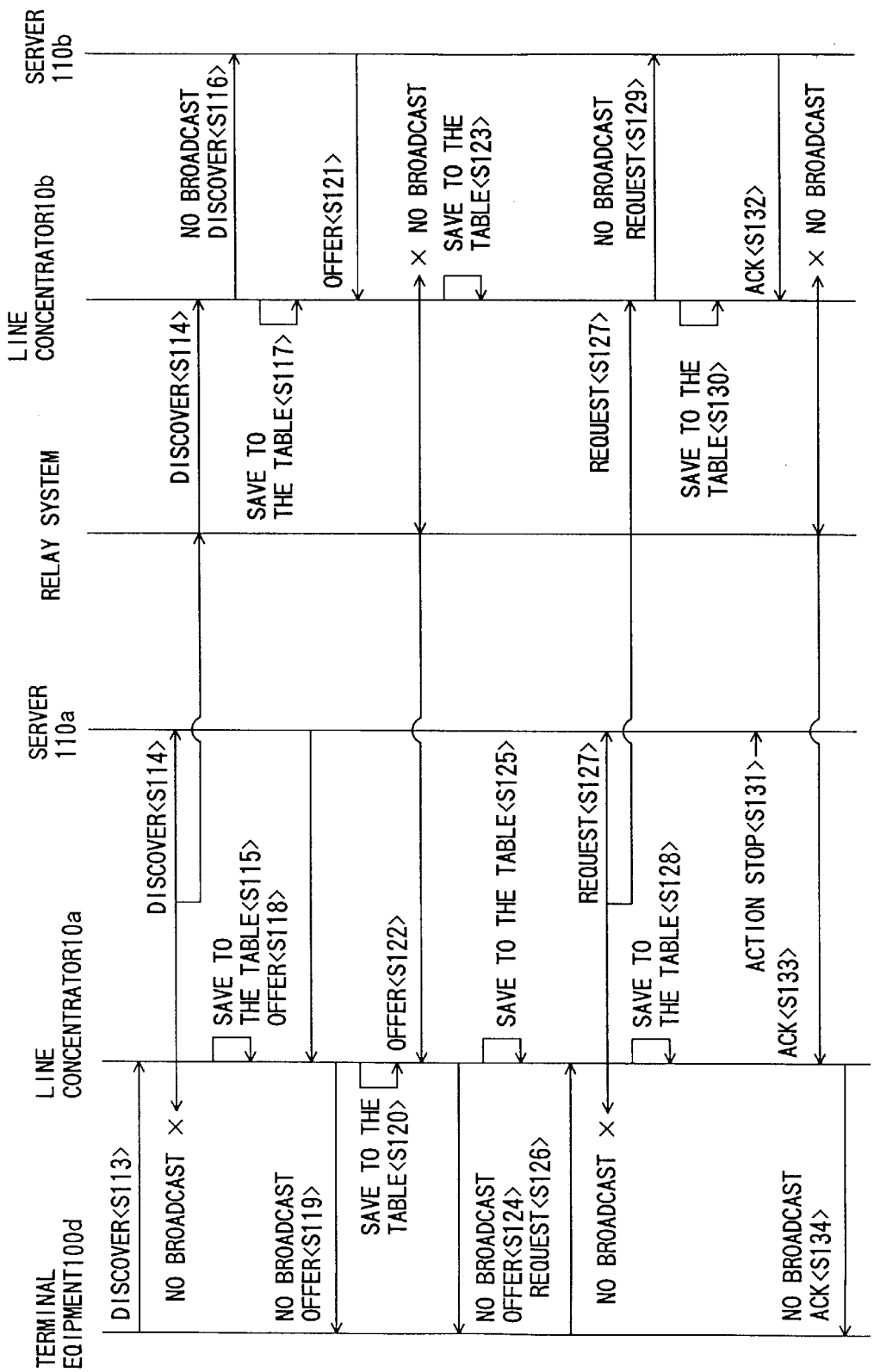
FIG. 7 is a sequence diagram showing the packet switching in the network system shown in FIG. 1.

The following is an explanation, referring to a sequence diagram shown in FIG. 7, of the packet switching when the terminal 100d obtains the network address from one of the servers 110a, 110b in an operating status (a state where the data packet is transferred and received between the terminal and the line concentrator) of the network system which has finished the pre-processing in steps S101–S112.

At first, the CPU 12 executes the control program, and the terminal 100d thereby generates the "DISCOVER packet", and this packet is transmitted to the line concentrator 10a <step S113>.

The predetermined interface 13 of the line concentrator 10a receives this "DISCOVER packet", whereby the following processes are executed within the line concentrator 10a. That is, the "DISCOVER packet" is accumulated in the buffer memory 14. The packet distinguishing function 21 is thereby actuated. The packet distinguishing function 21 performs the following processes. Obtained at first is the inherent number of the interface 13 receiving the "DISCOVER packet". Next, the packet distinguishing function 21 determines the packet accumulated in the buffer memory 14 as the "DISCOVER packet". Then, the communication line control function 60 is notified of the packet data with the above content. The communication line control function 60, upon receiving the packet data from the packet distinguishing function 21, reads from the first line data memory table 24a the inherent numbers of the respective interfaces that are stored in step S103 and in step S108 (see FIG. 6) in the pre-processing. Subsequently, the switch controller 15 (see FIG. 4) is supplied with the control signals for turning ON the unillustrated switches of the interfaces corresponding to these inherent numbers. The switch controller 15, upon receiving the control signals from the communication line control function 60, turns ON the switches of the respective interfaces 13 on the basis of the control signals. The "DISCOVER packet" is thereby brought into the transmittable state from the respective interfaces 13 receiving the "OFFER packet" in steps S103 and S108. Accordingly, the "DISCOVER packet" is sent from the interface 13 assuming the ON-state without being broadcasted. The "DISCOVER packet" is thereby transmitted to the server 110a and at the same time transmitted to the server 110b via the relay system 30 and the line concentrator 10b <step S114>.

When the "DISCOVER packet" transmitted from the relay system 30 is received by the interface 13 of the line concentrator 10b, the following processes are executed within the line concentrator 10b. That is, the "DISCOVER packet" is accumulated in the buffer memory 14, and the packet distinguishing function 21 obtains the inherent number of the interface 13 and then determines the packet as the "DISCOVER packet. Then, the packet distinguishing function 21 notifies the communication line control function 60 of the packet data having the above content. The communication line control function 60 reads the inherent number of the interface 13 that is stored in step S102 shown in FIG. 6, from the second line data memory table 24b. Then, the communication line control function 60 generates the control signal for turning ON the unillustrated switch of the interface 13 corresponding to the this inherent number and supplies the switch controller 15 with this control signal (see FIG. 4). The switch controller 15 turns ON the unillustrated switch of each interface 13 based on the control signal received from the communication line control function 60. The communication line for connecting the line concentrator 10b to the server 110b among the plurality of communication lines connected to the line concentrator 10b, is thereby brought into a packet transmittable status. Accordingly, the "DISCOVER packet" is transmitted to only the server 110b without being broadcasted <step S116>. Further, the communication line control function 60 stores the first line data memory table 24a with the inherent number of the interface receiving the "DISCOVER packet" obtained by the packet distinguishing function 21 in the internal processing of the line concentrator 10b described above <step S117>.

The server 110a, upon receiving the "DISCOVER packet", generates the "OFFER packet" containing a self server address and a plurality of unused network addresses and transmits this "OFFER packet" to the line concentrator 10a <step S118>.

This "OFFER packet" is, when received by the interface 13 of the line concentrator 10a, accumulated in the buffer memory 14. Then, the packet distinguishing function 21 is actuated; there is executed the same process as when the "DISCOVER packet" is received; and the communication line control function 60 is notified of the packet data. Hereupon, the communication line control function 60 reads the inherent number of the interface 13 that is stored in step S115, from the second line data memory table 24b. Then, the control signal for turning ON the unillustrated switch of the interface 13 corresponding to the inherent number and supplies the switch controller 15 with this control signal. The switch controller 15, upon receiving the control signals from the communication line control function 60, turns ON the switches of the respective interfaces 13 on the basis of the control signals. That is, the "OFFER packet" is transmittable from the interface receiving the "DISCOVER packet" in step S115. The "OFFER packet" is thereby transmitted to only the terminal 100d without being broadcasted <step S119>.

Further, the communication line control function 60 stores the first line data memory table 24a with the inherent number of the interface receiving the "OFFER packet" obtained by the packet distinguishing function 21 <step S120>. A storage content of the first line data memory table 24a, i.e., the inherent number of the interface 13 through which the line concentrator 10a receives the "OFFER packet", is updated.

On the other hand, the server 10b, upon receiving the "DISCOVER packet", generates the "OFFER packet" containing a self server address and a plurality of unused network addresses as in the case of the server 110a and transmits this "OFFER packet" to the line concentrator 10b <step S121>.

When the predetermined interface 13 of the line concentrator 10b receives this "OFFER packet", as in step S119, the "OFFER packet" is transmitted to only the relay system 30 without being broadcasted and then transmitted to the line concentrator 10a <step S122>.

Further, as in step S106 shown in FIG. 6, the communication line control function 60 stores the first line data memory table 24a with the inherent number of the interface receiving the "OFFER packet" obtained by the packet distinguishing function 21 <step S123>.

Then, when the predetermined interface 13 of the line concentrator 10a receives the "OFFER packet" transmitted from the relay system 30, this "OFFER packet" is, as in step S119, transmitted to only the terminal 100d <step S124>. Then, the first line data memory table 24a of the line concentrator 10a is stored with the inherent number of the interface 13 receiving the "OFFER packet" <step S125>.

The terminal 100d receives each of the "OFFER packets" transmitted by the servers 110a, 110b and selectively obtains one of the plurality of network addresses contained in these "OFFER packets". Then, the terminal 100d, upon obtaining the network addresses transmitted by, e.g., the server 110b, generates the "REQUEST packet" defined as a message signal with this purport and transmits this packet to the line concentrator 10a <step S126>.

When the predetermined interface 13 of the line concentrator 10a receives this "REQUEST packet", the same process as that executed in step S114 is performed, and the "REQUEST packet" is transmitted to the server 110a and the relay system 30 without being broadcasted <step S127>.

Further, the communication line control function 60 stores the second line data memory table 24b with the inherent number of the interface receiving the "REQUEST packet" <step S128>.

On the other hand, when the predetermined interface 13 of the line concentrator 10b receives the "REQUEST packet", the same process as that executed in step S116 is carried out, and the "REQUEST packet" is transmitted to the server 110b without being broadcasted <step S129>.

Further, the communication line control function 60 stores the second line data memory table 24b with the inherent number of the interface receiving the "REQUEST packet" <step S130>.

The server 110a, upon receiving the "REQUEST packet", analyzes a content of the "REQUEST packet". Then, the server 110a, when determining that the terminal 110d does not obtain self-possessed unused network address, stops the operation <step S131>.

On the other hand, the server 10b, when determining that the terminal 100d selectively obtained one of the self-possessed network addresses from the analysis of the content of the received "REQUEST packet", transmits an "ACK packet" defined as a signal with a purport of accepting and acknowledging that the terminal 100d obtains the network address <step S132>.

When the predetermined interface 13 of the line concentrator 10b receives this "ACK packet", the same process as in step S122 is executed, and this "ACK packet" is transmitted to only the relay system 30 without being broadcasted and then transmitted to the line concentrator 10a via the relay system 30 <step S133>.

When the predetermined interface 13 of the line concentrator 10a receives this "ACK packet", the same process as in step S124 is executed, and this "ACK packet" is transmitted to only the terminal 100d without being broadcasted <step S134>. Thus, the terminal 100d obtains the network address.

Note that when the data packets are transferred and received between the line concentrators 10a, 10b and the terminals 100a–100c and 1002 in steps S114, S116, S122, S124, S127, S129 and S134, the processes thereof are executed simultaneously with the above processes. That is, the bandwidths originally allocated to the terminals 100a–100c in order to transmit the address request packets, are allocated to the terminals in order to transmit the normal data packets.

The storage contents of the first line data memory datable 24a in each of the line concentrators 10a, 10b are updated each time a predetermined time has elapsed. Given hereinafter is an explanation, referring to a sequence diagram shown in FIG. 8, of the process when updating the storage contents of the first line data memory datable 24a of the line concentrator 10a.

In the network system that is in the operating status, the data are transferred and received via the relay system 30 or the line concentrators 10a, 10b between the terminals 100a–100e. On the other hand, the timer 16 illustrated in FIG. 4 in the line concentrator 10a measures a predetermined time <step S141>.

Then, when the timer 16 of the line concentrator 10a measures the predetermined time (time-out), the traffic volume measuring function 25 is actuated <step S142>. The traffic volume measuring function 25 measures a traffic volume in the network system <step S143>. That is, the traffic volume measuring function 25 at first measures the number of packets per unit time, which are accumulated in the buffer memory 14, thereby measuring a communication traffic volume. Subsequently, the traffic volume measuring function 25 compares a measured result with a fiducial traffic volume stored in the fiducial traffic volume memory table 26. Further, as a result of this comparison, if the measured result of the traffic volume is under the fiducial traffic volume, the address requesting function 22 is notified of this purport.

The address requesting function 22 is actuated upon receiving the notification from the traffic volume measuring function 25 and, as in the case of the above preprocessing, transmits the "DISCOVER packet" <step S144>. Thereafter, the same processes as steps S101–S112 shown in FIG. 6 are executed <steps S145–S155>.

Then, in the line concentrator 10a, when the "RELEASE packet" is transmitted in step S152, the timer 16 is reset and is brought into such a state as to measure the predetermined time once again <step S156>. That is, the processing returns to step S141. Thus, the inherent number of the interface 13 that is stored in the first line data memory table 24a of the line concentrator 10a, is updated.

Note that if the traffic volume measured by the traffic measuring function 25 exceeds the fiducial traffic volume, the traffic volume measuring function 25 stops the operation. The updating process of the storage contents of the first line data memory table is thereby stopped. Further, the same processes as those in steps S141–S155 are executed with respect to t he first line data memory table 24a of the line concentrator 10b, and the storage contents thereof are to be updated. Thus, the line concentrator 10a unperiodically updates the storage contents of the first line data memory table 24a and thus obtains latest positions (inherent numbers of the interfaces 13 receiving the "OFFER" packet) of the servers 110a, 110b.

Given next is an explanation of an operational example when the line concentrator 10a receives the internal control packet transmitted from the relay system 30. The internal control packet transmitted from the relay system 30 is received by the predetermined interface 13 of the line concentrator 10a and accumulated in the buffer memory 14. Hereupon, the packet distinguishing function 21 is actuated and analyzes a content of the internal control packet. The packet distinguishing function 21 thereby determines that the packet accumulated in the buffer memory 14 is defined as an internal control packet and, in this case, notifies the communication line control function 60 of this purport.

The communication line control function 60 supplies the switch controller 15 with the control signals for turning OFF unillustrated switches of all the interfaces 13 in the line concentrator 10a. The switch controller 15 sets all the unillustrated switched of the interfaces 13 in the OFF-state based on the control signals. Accordingly, the internal control packet comes into an untransmissible state from the line concentrator 10a and terminates in the line concentrator 10a. Note that the same operation is to be performed also when the line concentrator 10b receives the internal control packet from the relay system 30.

According to the network system in the embodiment 1, the terminal 100d receives the supply of the network address from the server 110a or 110b, and, in this case, each of the line concentrators 10a, 10b stores the inherent number of the interface 13 receiving the address request packet. Then, the interface 13 corresponding to the inherent number stored in each of the line concentrators 10a, 10b, is set in the transmittable state. With this processing, the address request packet is prevented from being broadcasted up to the terminal which does not require this packet. Simultaneously with this, the bandwidth allocated to originally transmit the address request packet is allocated to transmit the normal data packet. Accordingly, a decrease in throughput due to the reduction in terms of the bandwidth can be prevented, and it is feasible to smoothly transfer and receive the da between the terminals.

Further, the storage contents of the first line data memory table 24a of each of the line concentrators 10a, 10b are updated after a predetermined time has elapsed, and if the traffic volume of the network is under the fiducial traffic volume. It is therefore possible to make latest the storage content of the first line data storage table 24a while avoiding the decrease in the bandwidth. Further, processing burdens on the line concentrators 10a, 10b can be also reduced.

Moreover, each of the line concentrators 10a, 10b, when receiving the internal control packet, terminates this internal control packet. The internal control packet is thereby prevented from being transmitted to the terminals 100a–100e. Accordingly, it is feasible to hold a confidentiality of content of the internal control packet and to avoid a drop in terms of the throughput that might be caused by the internal control packet being broadcasted.

Figure 8:
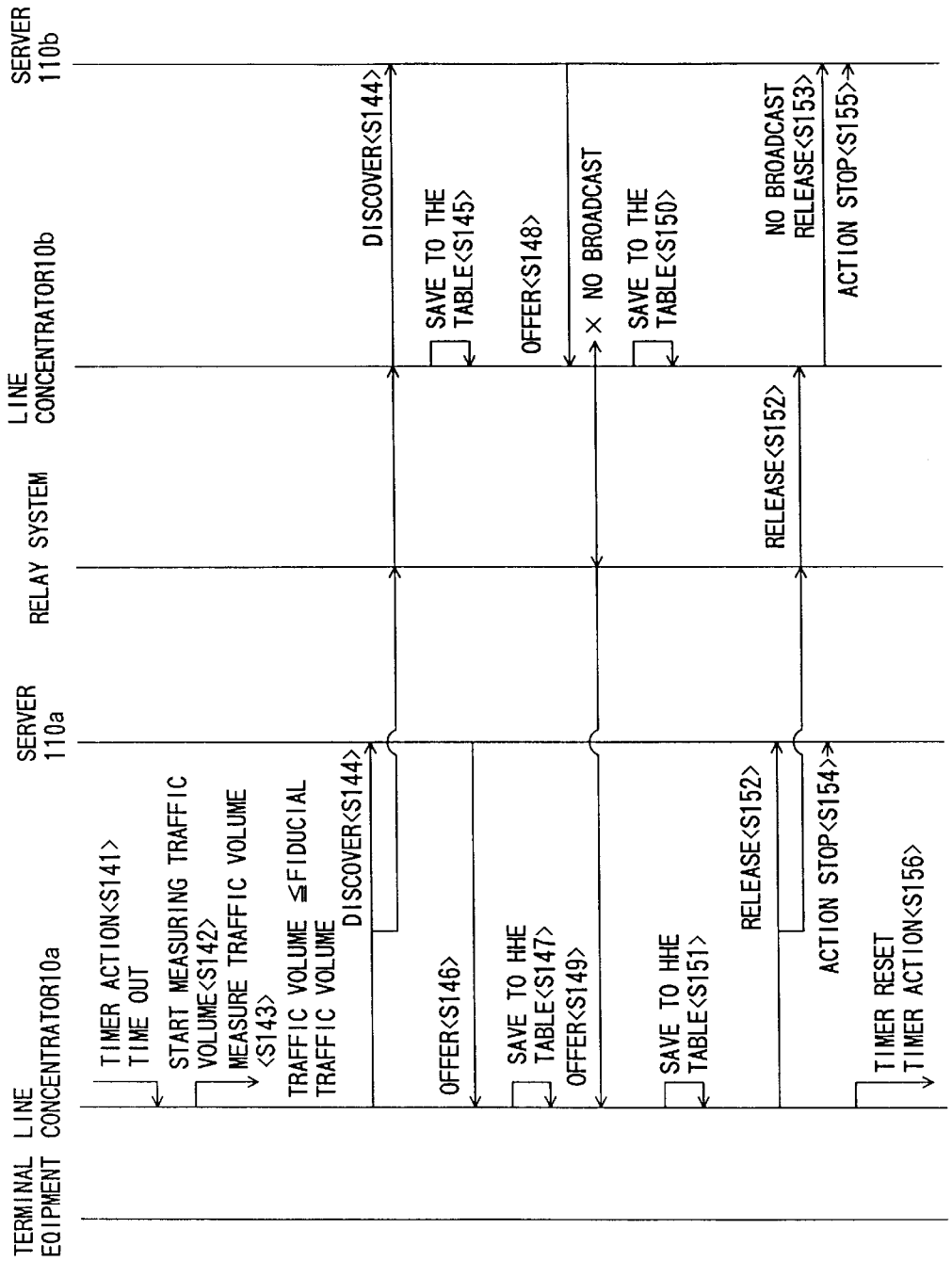
FIG. 8 is a sequence diagram showing the packet switching in the network system shown in FIG. 1.
Figure 9:
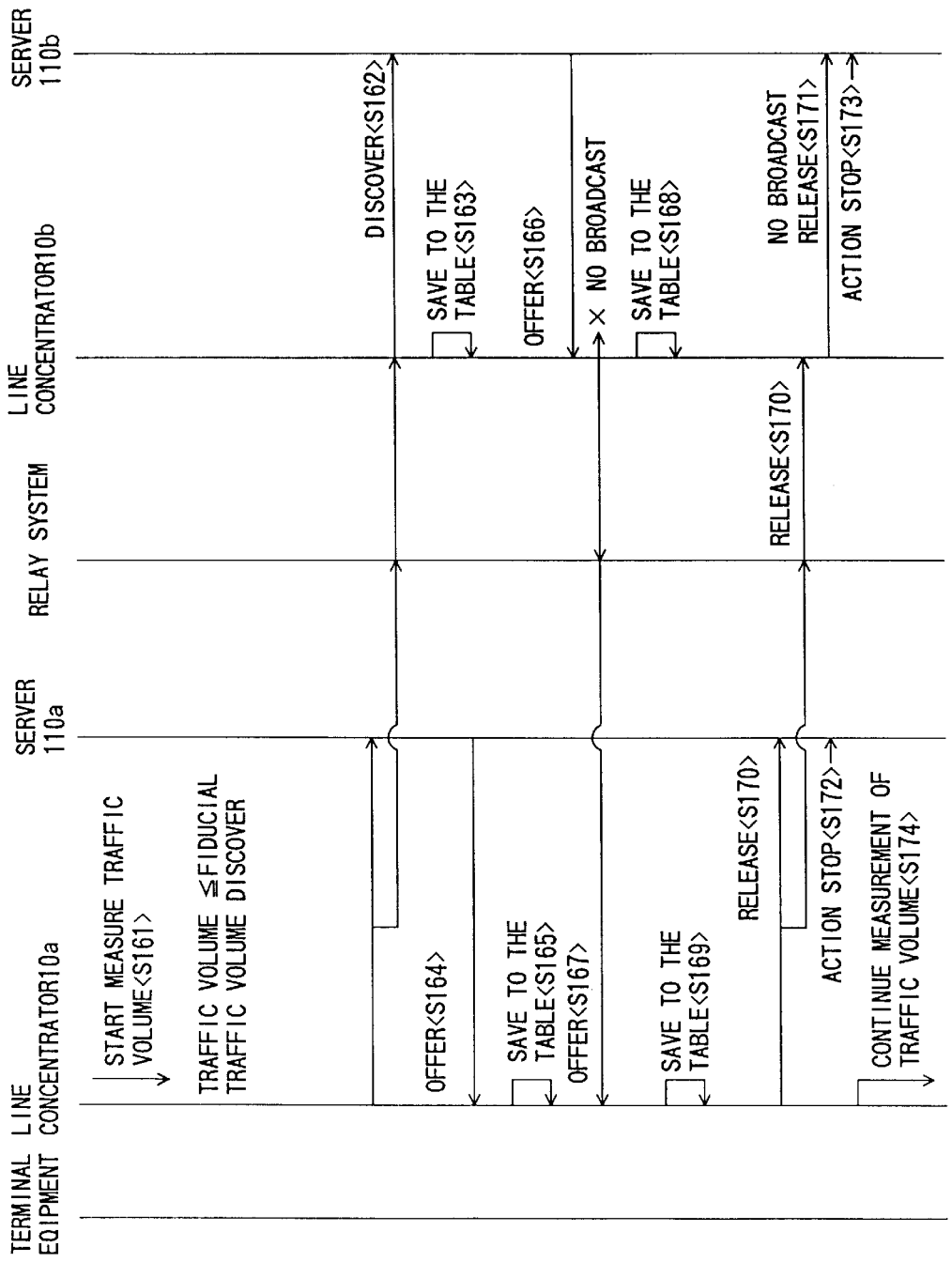
FIG. 9 is a sequence diagram showing the packet switching in another embodiment.

Note that the line concentrators 10a, 10b shown in FIG. 1 may include neither the timer 16 nor the traffic volume measuring function 25. Explained hereinbelow with reference to a sequence diagram shown in FIG. 8 is a case where the storage contents of the first line data memory datable 24a of the line concentrator 10a are updated in such an arrangement that the timer 16 is removed from the line concentrator 10a illustrated in FIG. 1. As shown in FIG. 8, the traffic volume measuring function 25 of the line concentrator 10a in the operating status always measures a communication traffic volume of the network system <step S161>. That is, the traffic volume measuring function 25 continuously compares a measured value of the communication traffic volume with the fiducial traffic volume stored in the fiducial traffic volume memory table 26. Then, when the traffic volume measuring function 25 measures a traffic volume under the fiducial traffic volume, the address requesting function 22 is actuated, whereby the "DISCOVER packet" is transmitted to the servers 110a, 110b <step S162>. Thereafter, the processes in steps S163–S173 are the same as those in steps S145–S155, and therefore the explanations thereof will be omitted. Then, in the line concentrator 10a, when the "RELEASE packet" is transmitted in step S170, the traffic volume measuring function 25 restarts measuring the traffic volume. That is, the processing returns to the status in step S161. If the traffic volume is equal to the fiducial traffic volume or under, the storage contents of the first line data memory table 24a may be updated.

Figure 10:
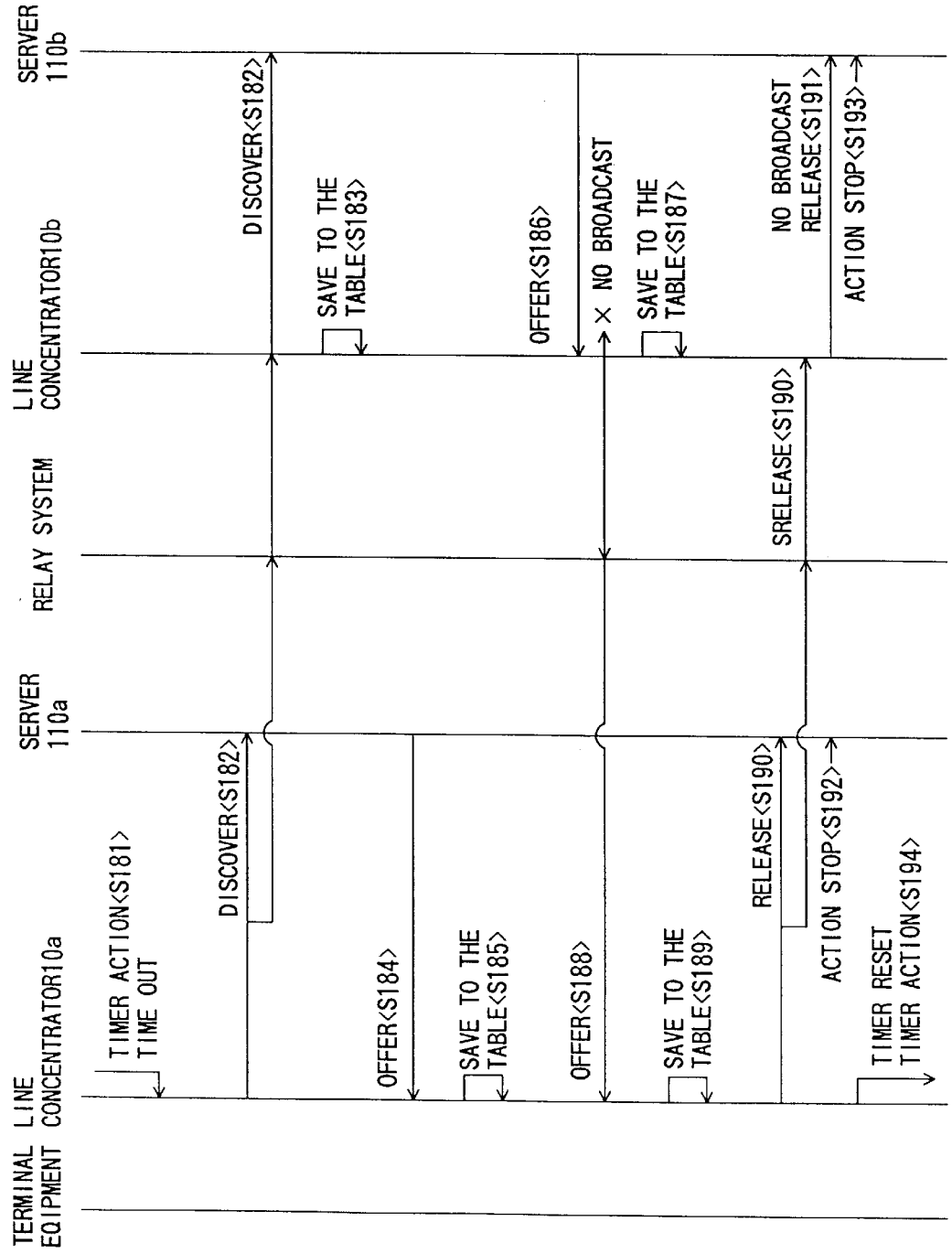
FIG. 10 is a sequence diagram showing the packet switching in still another embodiment.

Explained further with reference to a sequence diagram shown in FIG. 10 is an arrangement that the line concentrator 10a does not include the traffic volume measuring function 25. As illustrated in FIG. 10, when the timer 16 of the line concentrator 10a in the operating status measures a predetermined time <step S181>, the address requesting function 22 transmits the "DISCOVER packet" to the servers 110a, 110b <step S182>. Thereafter, the processes in steps S183–S193 are the same as those in steps S145–S155 shown in FIG. 8, and hence the explanations thereof will be omitted. Then, in the line concentrator 10a, when the "RELEASE packet" is transmitted, the timer 16 is reset and resumes its operation <step S194>. Namely, the processing returns to the status in step S181. Thus, each time a fixed time elapses, the storage contents of the first line data memory table 24a may be updated.

Figure 11:
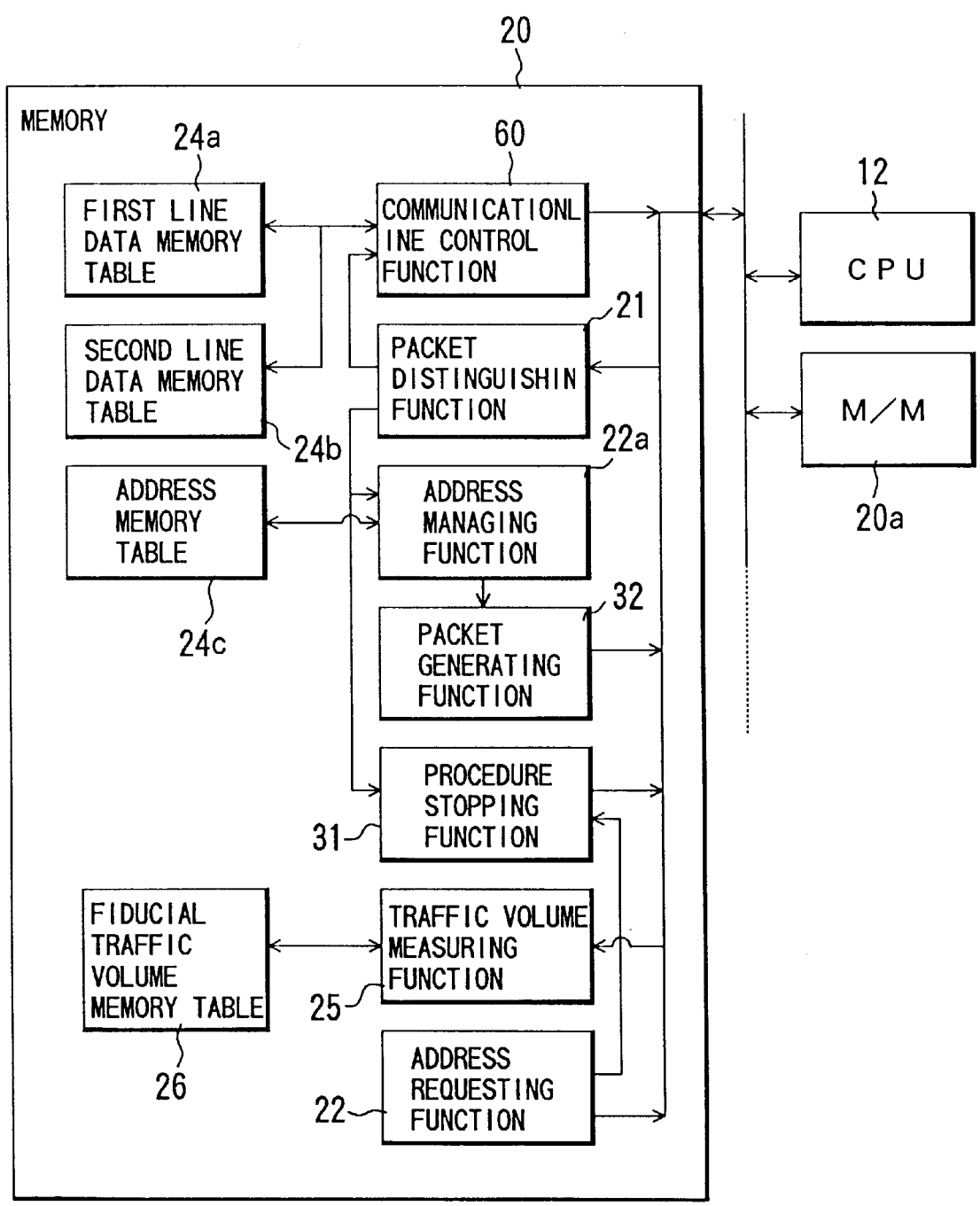
FIG. 11 is a block diagram illustrating the memory device of the line concentrator in yet another embodiment.

Further, the memory device 20 of each of the line concentrators 10a, 10b may be stored with, as illustrated in a block diagram of FIG. 11, an address managing function 22a (corresponding to an address managing element), a packet generating function 32 (corresponding to a packet generating element), and an address memory table 24c (corresponding to an address storing element). Herein the when the address managing function 22a receives an item of packet data about the "OFFER packet" from the packet distinguishing function 21, the address memory table 24c is stored with a server address of the server 110a or 110b that is contained in the packet data. Further, the address managing function 22a, in the case of receiving an item of packet data on the "DISCOVER packet" from the packet distinguishing function 21, reads the server address from the address memory table 24c, and notifies the packet generating function 32 of this server address. The packet generating function 32 generates the "DISCOVER packet" wherein the server address received from the address managing function 32 serves as a packet-transmitted address, and unicasts the "DISCOVER packet" to the server 110a or 110b. The "DISCOVER packet" is thereby transmitted to the server 110a or 110b without being broadcasted.

Note that the terminals 100a–100c and 100e are, as a matter of course, allowed to perform address request packet switching between the servers 110a, 110b.

<Embodiment 2>

Next, an embodiment 2 of the network system will be discussed with reference to the accompanying drawings. The embodiment 2 of the network system is concerned with Ethernet, wherein the network protocol is IP (Internet Protocol).

To start with, an outline of the embodiment 2 of the network system will be described with reference to FIG. 12.

Figure 12:
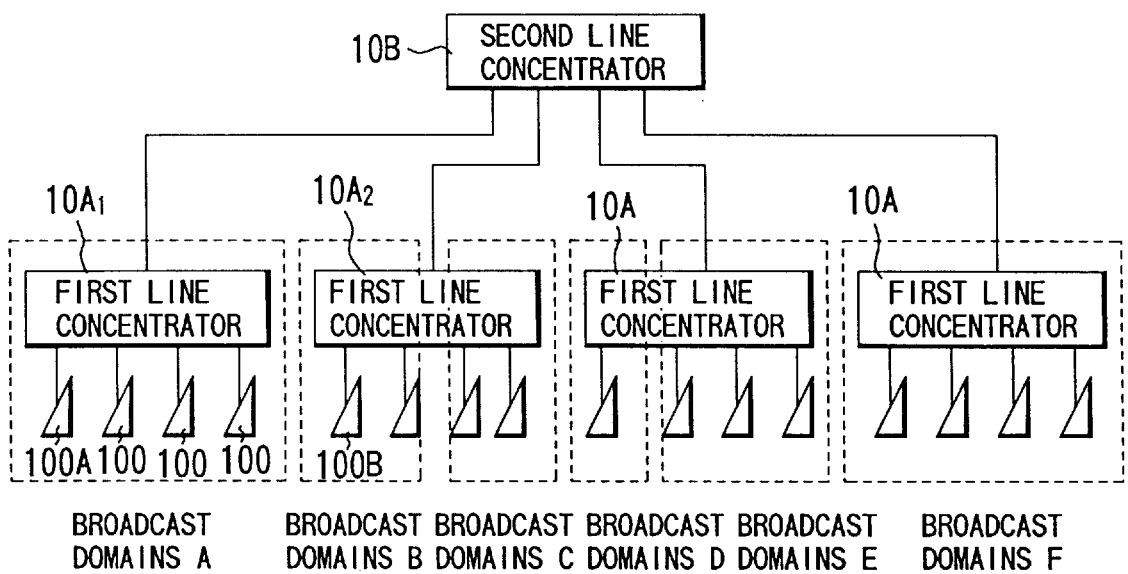
FIG. 12 is a block diagram showing a whole construction of the network system in accordance with an embodiment 2 of the present invention.

FIG. 12 is a block diagram showing a whole configuration of the network system in accordance with the embodiment 2. Referring to FIG. 12, the network system has a star-like topology, wherein a plurality of line concentrators 10A each defined as a LAN switch (switching HUB) are provided, and a plurality of terminals 100 are connected via the communication lines to the first line concentrators 10A. Provided further is a second line concentrator 10B defined as a LAN switch (switching HUB) as a host line concentrator above the first line concentrators 10A. The second line concentrator 10B is connected via the communication lines to each of the first line concentrators 10A. Note that the plurality of terminals 100 connected to the first line concentrators 10A are divided into arbitrary broadcast domains A–F by setting of the respective first line concentrators 10A.

Referring again to FIG. 12, each terminal 100 has predetermined items of data and, when transmitting the self-possessed data to one of other terminals 100, requires an IP address and a MAC address of this data-transmitted terminal 100. Hence, if the data-transmitting terminal has no MAC address of the data-transmitted terminal, the data-transmitting terminal 100 transmits an ARP (Address Resolution Protocol) request packet defined as a packet for obtaining the MAC address of this unknown terminal (which corresponds to an APR requesting element). This ARP request packet is stored with pieces of address data such as an IP address of the terminal requesting a supply of the MAC address, a data-transmitting MAC address and a data-transmitting IP address.

Figure 13:
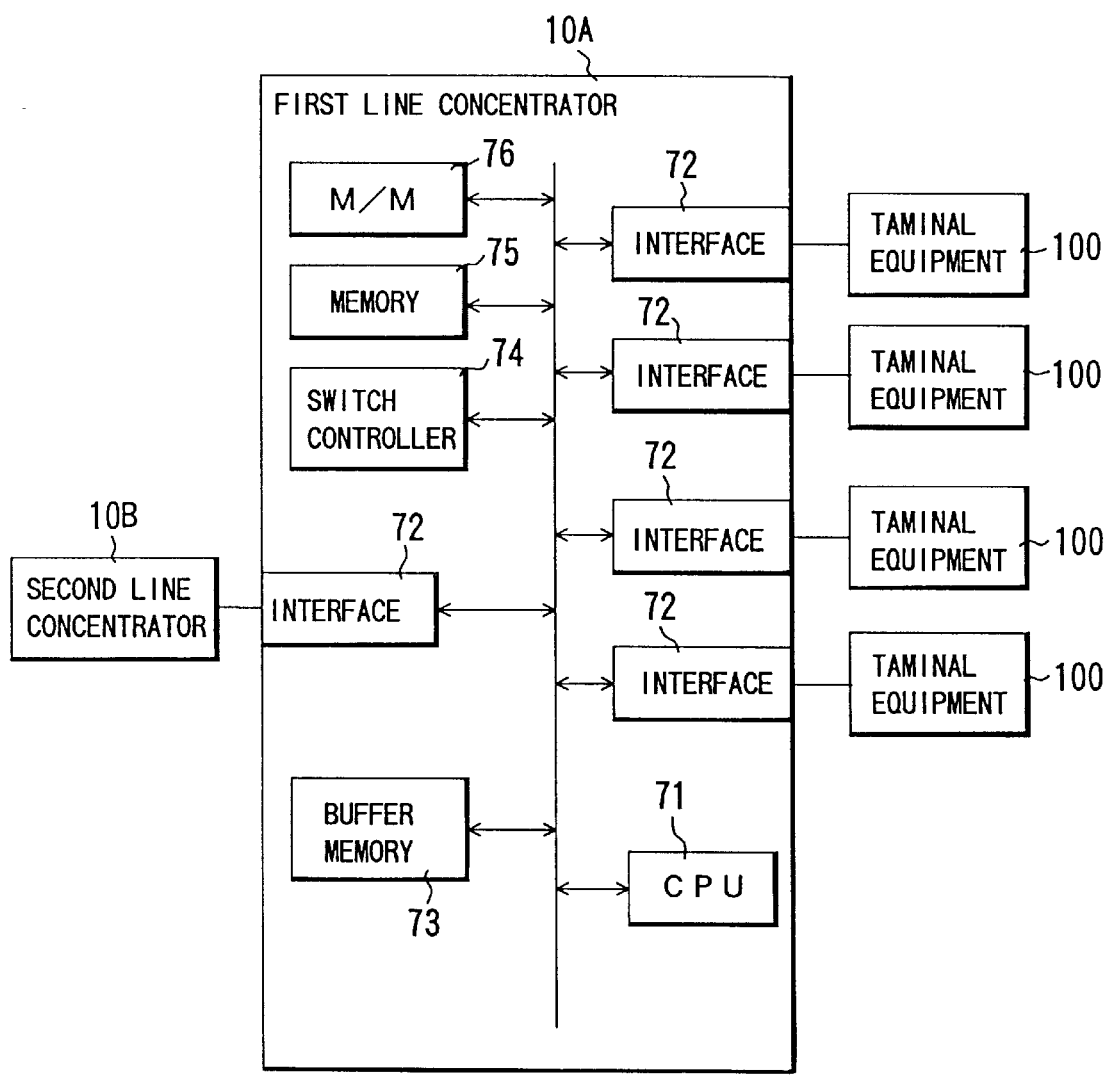
FIG. 13 is a block diagram illustrating a construction of a first line concentrator shown in FIG. 12.
Figure 14:
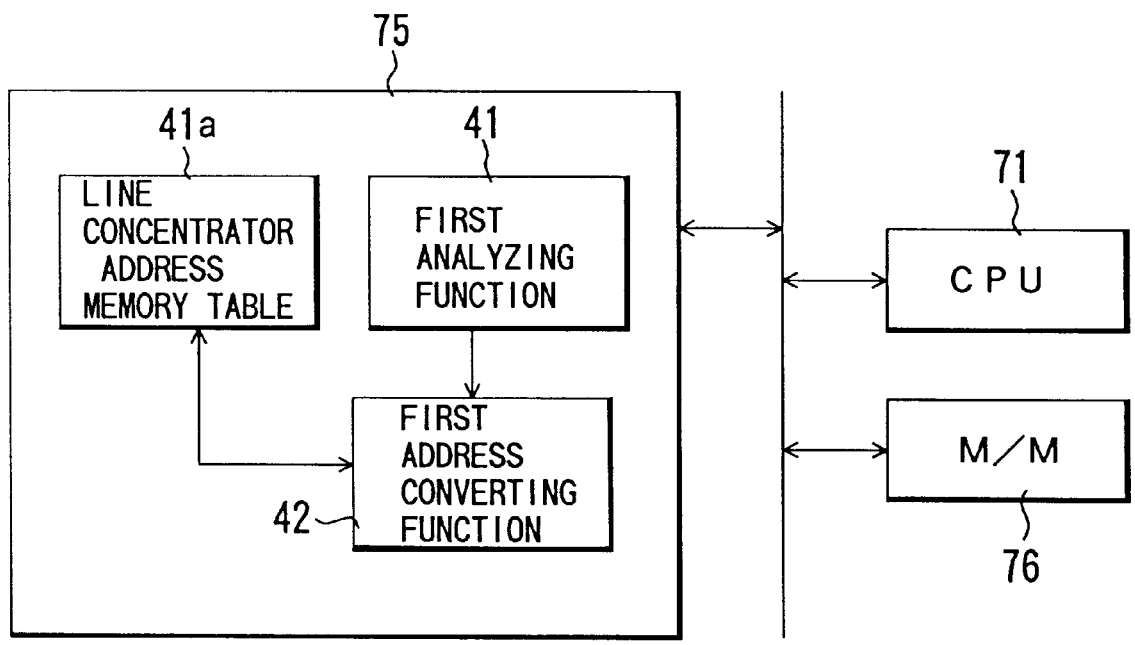
FIG. 14 is a block diagram illustrating a memory device of the first line concentrator shown in FIG. 13.

Next, the first line concentrator 10A will be described with reference to FIGS. 13 and 14. FIG. 13 is a block diagram illustrating a hardware architecture of the first line concentrator 10A. Referring to FIG. 13, the first line concentrator 10A is constructed of a CPU 71, a plurality of interfaces 72, a buffer memory 73, a switch controller 74, a memory device 75 and a main memory 76. These components are the same as those in the embodiment 1, and therefore their explanations are omitted. Storage contents of the memory device 75 are, however, different from those in the embodiment 1. FIG. 14 is a block diagram showing the storage contents of the memory device 75 in the first line concentrator 10A. Referring to FIG. 14, the memory device 75 is stored with a first analyzing function 41, a first address converting function 42 (corresponding to a first address converting element), and a line concentrator address memory able 41*a*. Herein, the line concentrator address memory table 41*a* is stored with a MAC address of the second line concentrator 10B. Further, the first analyzing function 41 analyzes contents of the packets accumulated in the buffer memory 73. The first analyzing function 41, when determining that the packet concerned is an ARP request packet, notifies the first address converting function 42 of this purport, and then terminates the ARP request packet. Furthermore, the first address converting function 42 reads the MAC address of the second line concentrator 10B that is stored in the line concentrator address memory table 41*a*. The first address converting function 42 then rewrites a packet transmitted address of the ARP request packet accumulated in the buffer memory 73, into a MAC address of the second line concentrator 10B based on a broadcast designation, and transmits the same ARP request packet to the second line concentrator 10B. Note that the above first analyzing function 41 and first address converting function 42 are defined as control programs stored in the memory device 75 and therefore functions actualized by the CPU 71 executing these control programs read to the main memory 76 as the necessity arises.

Figure 15:
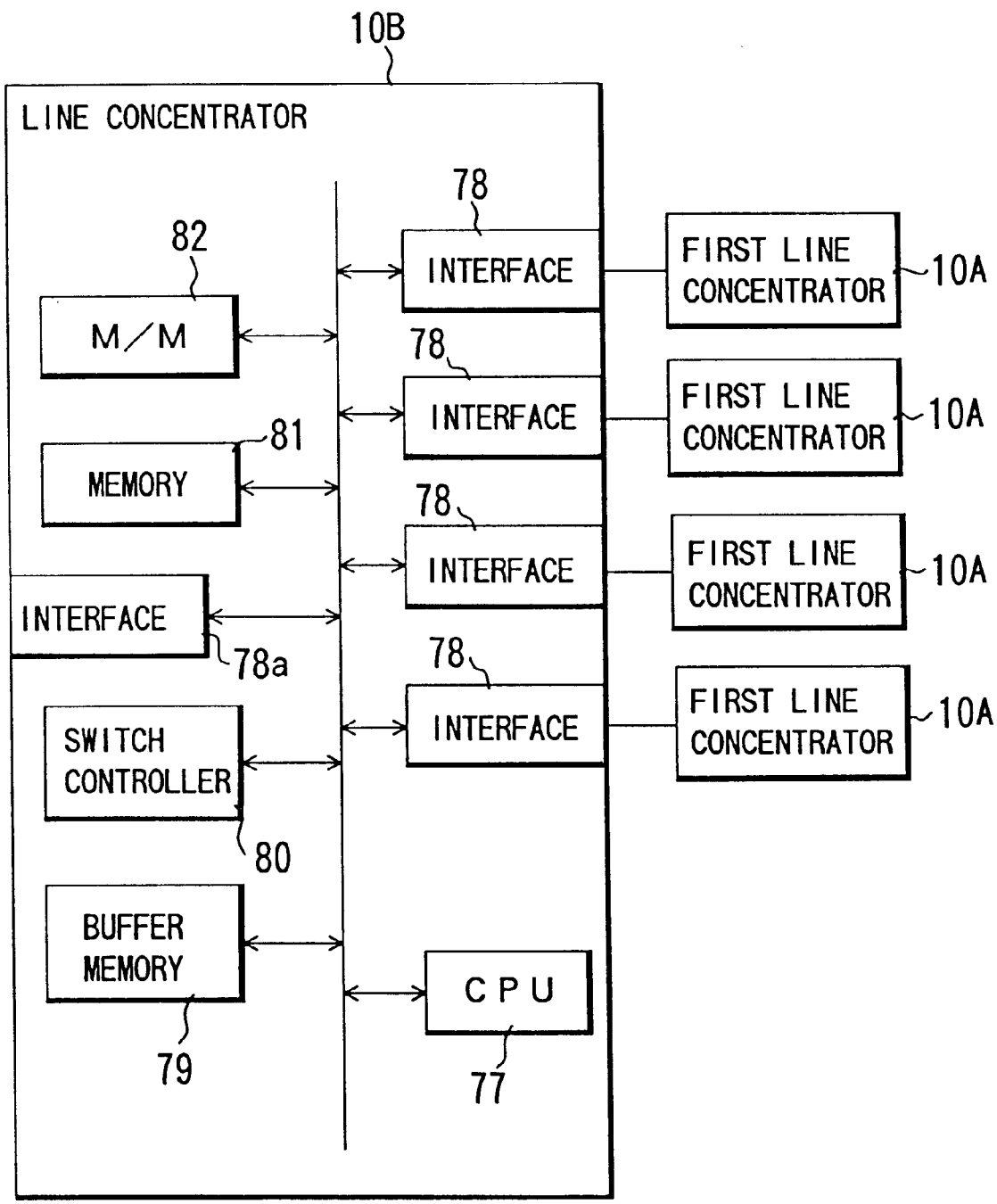
FIG. 15 is a block diagram illustrating a construction of a second line concentrator shown in FIG. 12.
Figure 16:
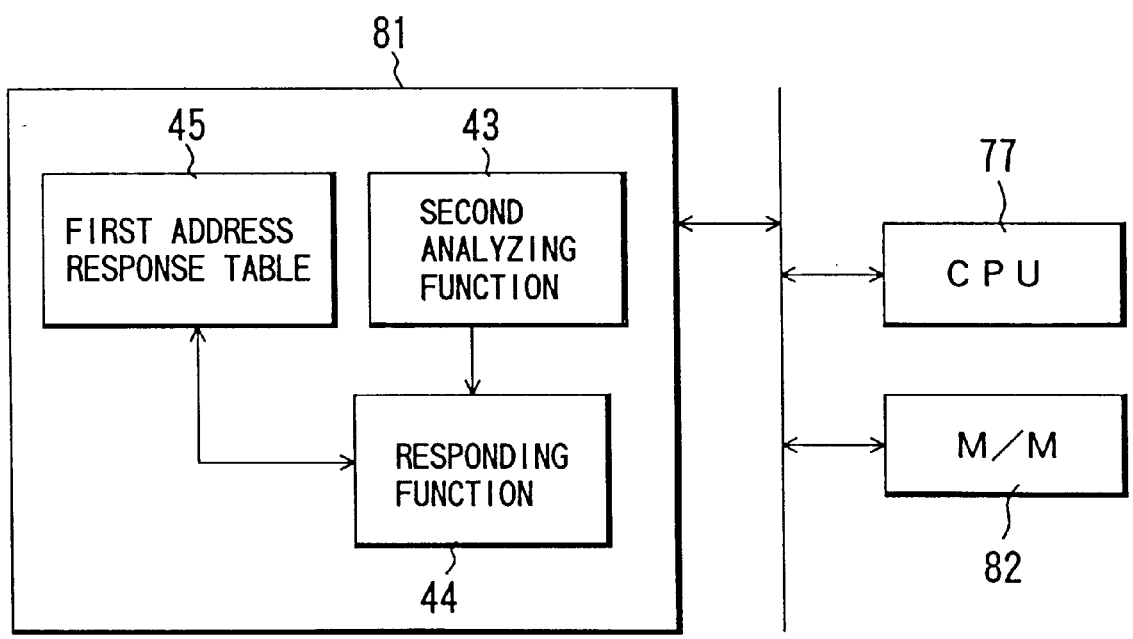
FIG. 16 is a block diagram showing a memory device of the second line concentrator shown in FIG. 15.

Next, the second line concentrator 10B will be explained with reference to FIGS. 15 and 16. FIG. 15 is a block diagram illustrating a hardware architecture of the second line concentrator 10B. Referring again to FIG. 15, the second line concentrator 10B is constructed a CPU 77, a plurality of interfaces 78, a buffer memory 79, a switch controller 80, a memory device 81 and a main memory 82. These components are the same as those of the first line concentrator 10A, and therefore their explanations are omitted. Storage contents of the memory device 81 are, however, different. FIG. 16 is a block diagram showing the storage contents of the memory device 81 in the second line concentrator 10B. Referring again to FIG. 16, the memory device 81 is stored with a second function 43, a responding function 44 (corresponding to a responding element), and a first address corresponding table 45. Herein, the first address corresponding table 45 is stored with the IP addresses of all the terminals 100 in the present network system in such a form as to correspond to the MAC addresses. Further, the second analyzing function 43 analyzes a content of the packet received by a predetermined interface 13 of the second line concentrator 10B and accumulated in the buffer memory 79. Then, the second analyzing function 43, when determining that the packet accumulated in the buffer memory 79 is the ARP request packet, terminals this ARP request packet and notifies the responding function 44 of this purport. Furthermore, the responding function 44 extracts the IP address of the terminal requesting the supply of the MAC address from the ARP request packet accumulated in the buffer memory 79. The responding function 44 then retrieves inside the address corresponding table 45 with the IP address serving as a retrieval key, and detects the MAC address corresponding to the IP address. Subsequently, the responding function 44 extracts the MAC address of the terminal that has transmitted the ARP request packet from the ARP request packet accumulated in the buffer memory 79. Then, the responding function 44, when the terminal transmitting the ARP request packet is set as a destination of transmission, generates an ARP response packet containing the MAC address requested for the supply thereof by the same terminal. Note that the second analyzing function 43 and the responding function 44 are defined as control programs stored in the memory device 81 and therefore functions actualized by the CPU 77 executing these control programs read to the main memory 82 according to the necessity.

Figure 17:
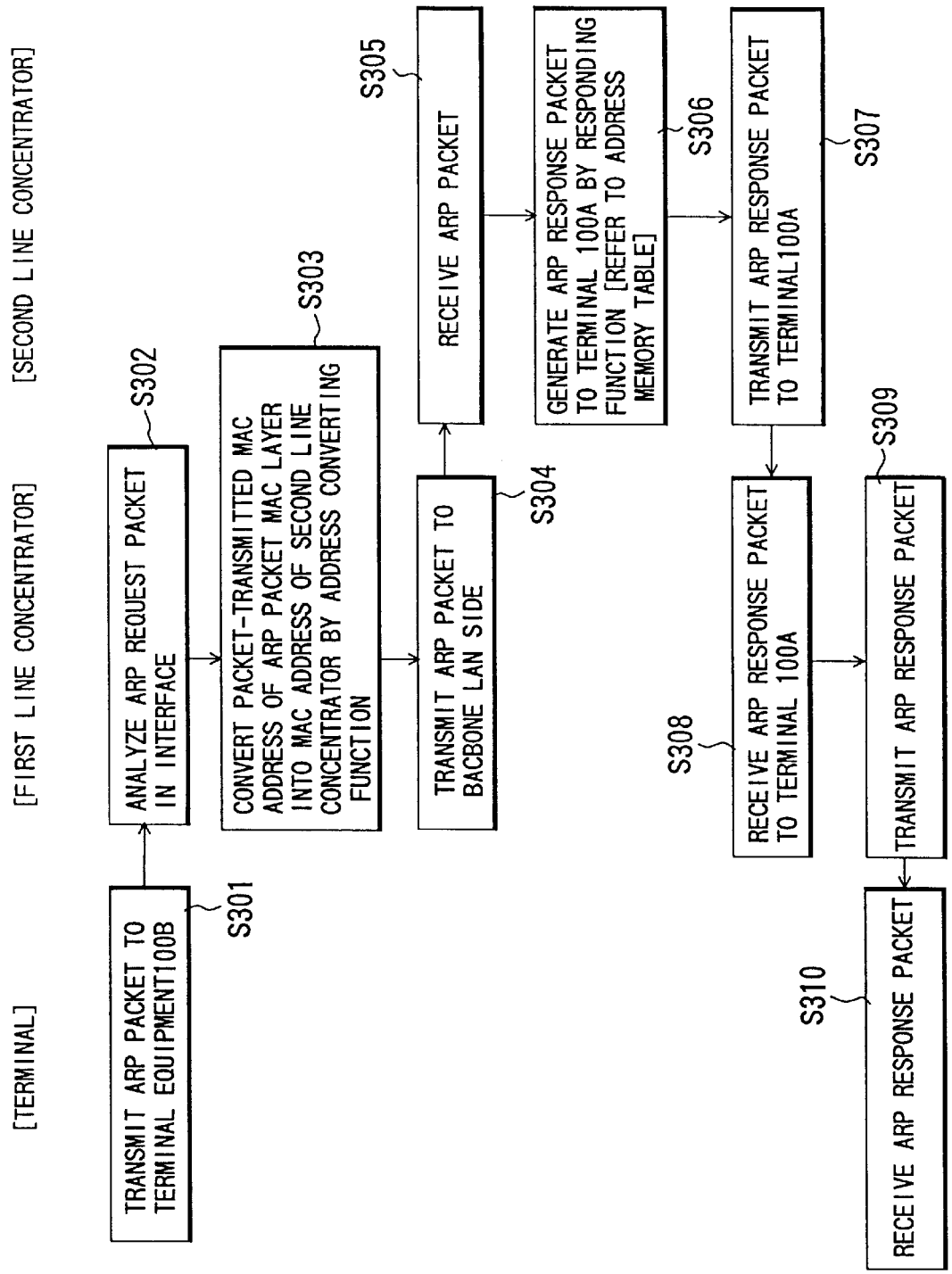
FIG. 17 is a flowchart showing an example of operation of the network system shown in FIG. 12.

Explained next with reference to a flowchart of FIG. 17 is such a case that, in the network system having the above construction, the terminal 100A belonging to a broadcast domain A shown in FIG. 12 transmits the ARP request packet in order to obtain the MAC address of the terminal 100B belonging to a broadcast domain B. First, the ARP request packet requesting the supply of the MAC address of the terminal 100B is broadcasted from the terminal 100A <step S301>.

This ARP request packet is transmitted via the communication line to the first line concentrator 10A, received by a predetermined interface 72 (see FIG. 13) and accumulated in the buffer memory 73. The first analyzing function 41 is thereby actuated and analyzes a content of the ARP request packet. The first analyzing function 41, when determining that the packet accumulated in the buffer memory 73 is the ARP request packet from the analysis, notifies the first address converting function 42 of this purport and terminals the same ARP request packet <step S302>. With this processing, the ARP request packet is prevented from being broadcasted to the broadcast domain A.

Next, the first address converting function 42 is actuated and reads the MAC address of the second line concentrator 10B from the line concentrator address memory table 41*a*. The first address converting function 42 then generates the ARP request packet wherein the packet-transmitted address of the ARP request packet accumulated in the buffer memory 73 is converted into the MAC address of the second line concentrator 10B <step S303>.

The ARP request packet generated in step S303 is sent from an interface 78*a* on the side of a backbone LAN. More specifically, the ARP request packet is unicasted to the second line concentrator 10B from the interface 78*a* on the side of the backbone LAN <step S304>.

Next, in the second line concentrator 10B, the ARP request packet is received by the predetermined interface 78 (see FIG. 15) and accumulated in the buffer memory 79. Hereupon, the second analyzing function 43 is actuated. The second analyzing function 43 analyzes a content of the packet accumulated in the buffer memory 79. The second analyzing function 43, when determining that the packet is the ARP request packet, notifies the responding function 44 of this purport and terminals the same ARP request packet <step S305>.

Next, the responding function 44 is, upon receiving the notification from the second analyzing function 43, actuated and extracts the IP address of the terminal 100B from the ARP request packet accumulated in the buffer memory 79. Then, the responding function 44 retrieves the first address corresponding table 45 in accordance with the extracted IP address, and detects the MAC address of the terminal 100B that is stored corresponding to the IP address of the terminal 100B. Further, the responding function 44 generates the ARP response packet with the MAC address of the terminal 100A serving as a transmission destination address <step S306>.

Then, the ARP response packet that is to be transmitted to the terminal 100A is unicasted to the firs line concentrator 10A transmitting the ARP request packet in step S304, from the predetermined interface 78 <step S307>.

When this ARP response packet is received by the first line concentrator 10A <step S308>, the first line concentrator 10A unicasts the ARP response packet to the terminal 100A based on the packet-transmitted MAC address contained in the ARP response packet <step S309>. Subsequently, the ARP response packet is received by the terminal 100A <step S310>. The terminal 100A thereby obtains the MAC address of the terminal 100B and comes into the data transmittable status to the terminal 100B.

According to the network system discussed above, the first address converting function 42 of the first line concentrator 10A converts the broadcast designation of the MAC address of the ARP request packet into the MAC address of the second line concentrator 10B. The broadcast packet is thereby converted into the unicast packet, and hence it is possible to prevent an unnecessary ARP request packet from being transmitted to other terminals 100 within the broadcast domain.

Further, the first line concentrators 10A, which have hitherto been connected to each other by use of the relay system such as the router, are connected by use of the second line concentrator 10B. The ARP response packet is generated in this second line concentrator 10B and unicasted to and received by the terminal 100 via the first line concentrator 10A. Therefore, no ARP request packets are transmitted to the first line concentrators 10A exclusive of the first line concentrator 10A transmitting the ARP request packet. Accordingly, it is feasible to omit the processes produced by these first line concentrators 10A receiving the ARP request packet. Further, the process, which should hitherto be executed by the terminal requested for the supply of the MAC address, is performed by second line concentrator 10B instead of the above terminal, and it is therefore possible for the terminal transmitting the ARP request packet to receive the ARP response packet faster than before.

Note that the first line concentrator 10A may involve the use of a conventional line concentrator (LAN switch). In this case, the ARP request packet is transmitted to all the broadcast domains A by the conventional line concentrators, whereby the second line concentrator 10B receives the ARP request packet. Even in such a case, the second line concentrator 10B generates the ARP response packet, and the ARP response packet is unicasted to the terminal 100 transmitting the ARP request packet.

Accordingly, unlike the conventional way, the relay system receiving the broadcast packet from one of the first line concentrators 10A never broadcasts this packet to other first line concentrators 10A. Hence, it is possible to prevent the reduction in the bandwidths between the first line concentrators 10A and the second line concentrator 10B.

Furthermore, the relay system such as the router is capable of converting the packet-transmitted MAC address of the ARP request packet received by setting and transmitting the ARP request packet from the predetermined interface. In this case, however, the processing is executed by the software-based method and therefore time-consuming. In accordance with the embodiment 2, the second line concentrator 10B is employed in place of the relay system such as the router, and hence it is feasible to the execute the above processing by the hardware-based method. Accordingly, the data can be transmitted at a higher speed than by use of the relay system such as the router.

Thus, it is possible to correspond to a multimedia application which will spread from now on into the future by obviating a deficiency of the bandwidths that might be attributed to a shared media type architecture.

<Embodiment 3>

Figure 18:
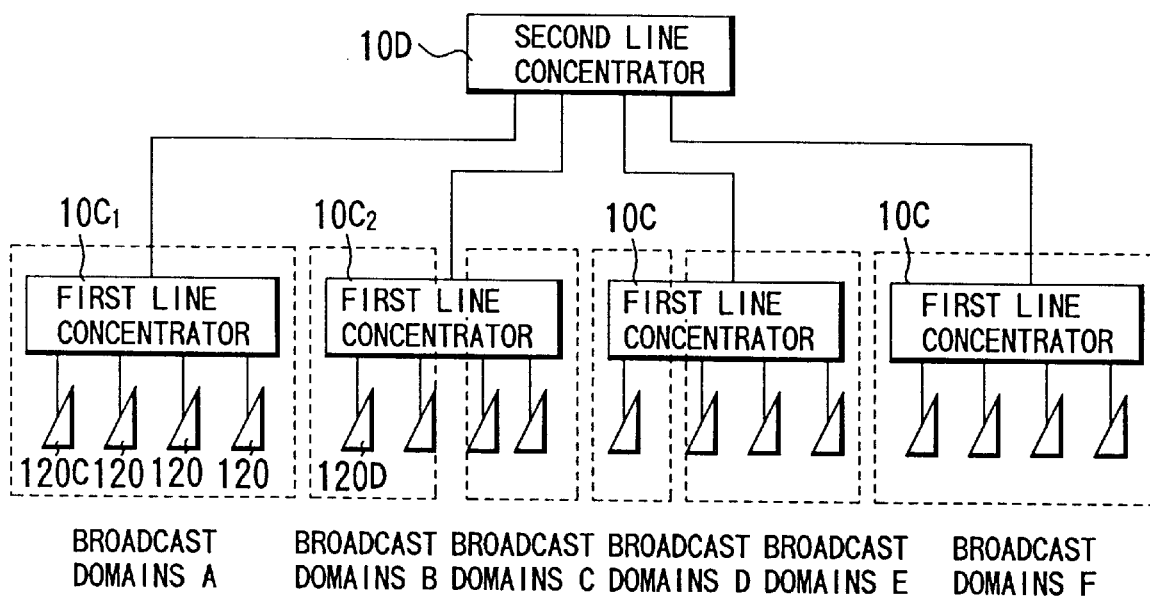
FIG. 18 is a block diagram illustrating a whole construction of the network system in accordance with an embodiment 3 of the present invention.

Next, an embodiment 3 of the network system of the present invention will be discussed. FIG. 18 is a block diagram illustrating a whole configuration of the network system in the embodiment 3. The present network system is also concerned with Ethernet, wherein the whole configuration is substantially the same as that of the network system in the embodiment 2. To be specific, as illustrated in FIG. 18, a plurality of terminals 120 are connected via the communication lines to a plurality of first line concentrators 10C, and each of the first line concentrators 10C are connected via the communication lines to a second line concentrator 10D.

Figure 19:
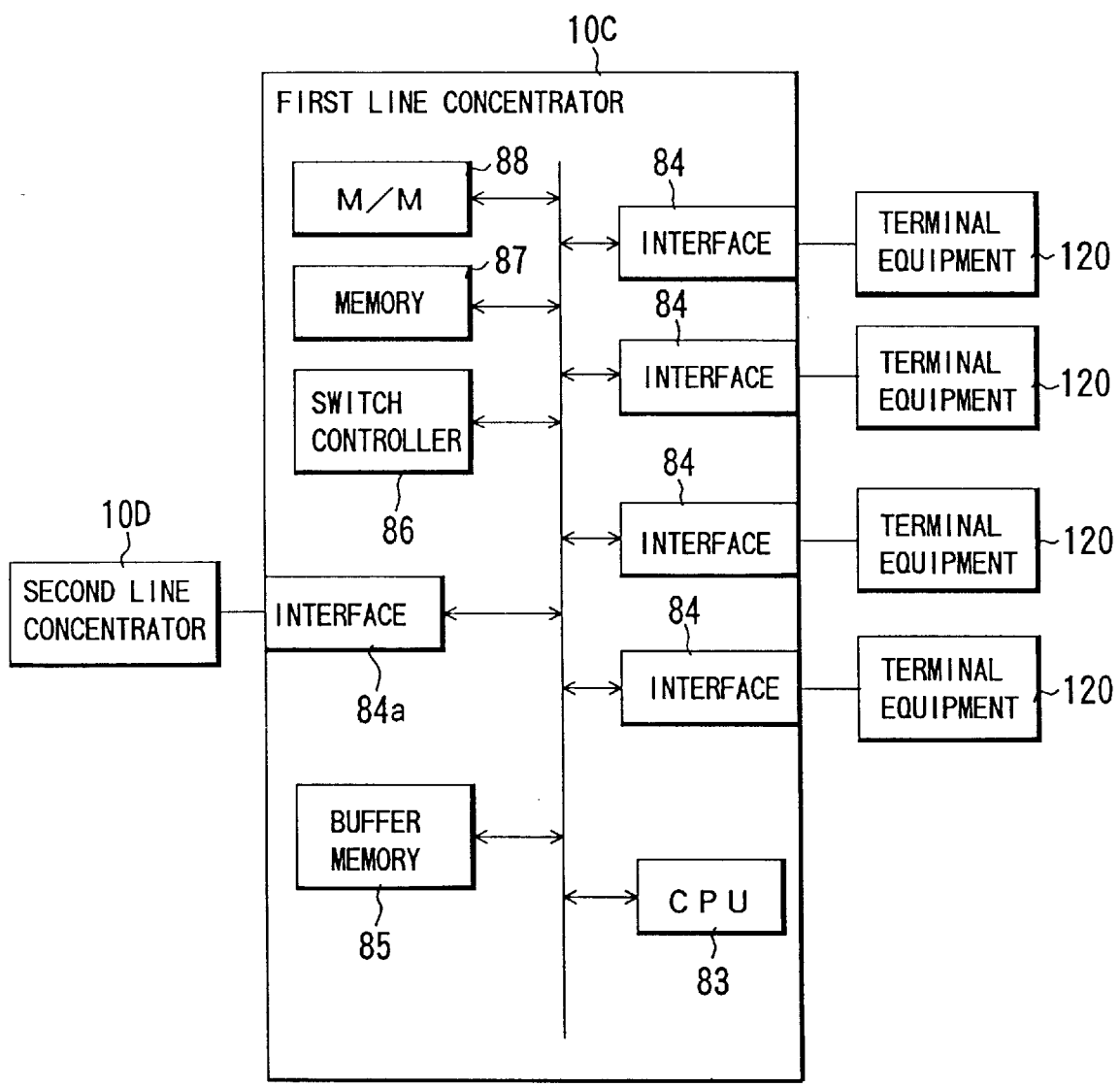
FIG. 19 is a block diagram showing a construction of the first line concentrator shown in FIG. 18.
Figure 20:
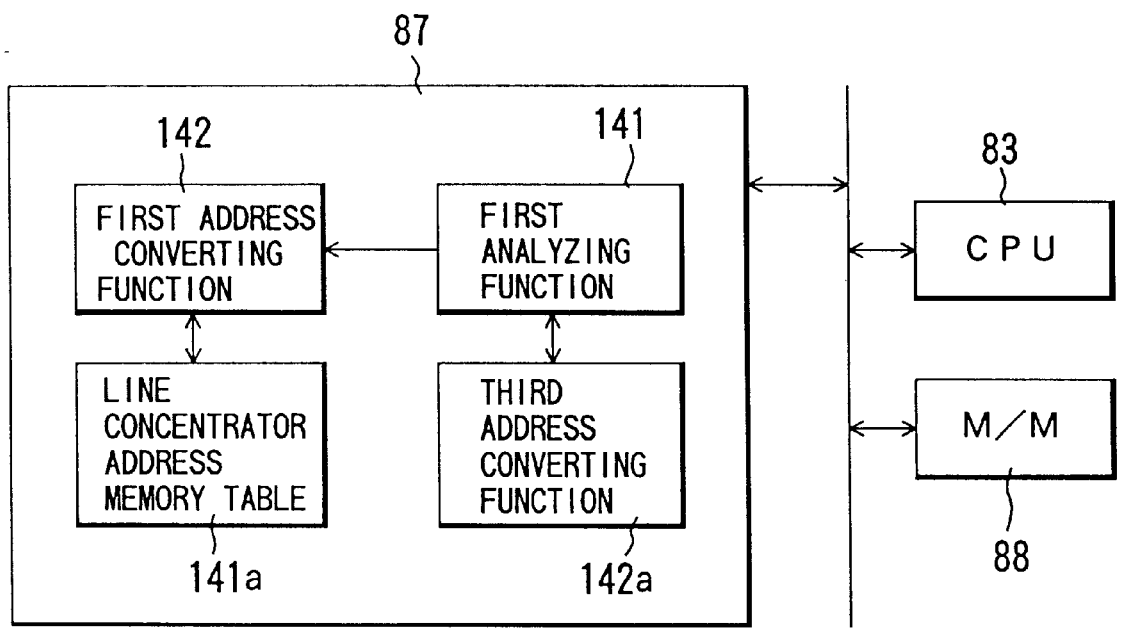
FIG. 20 is a block diagram illustrating a memory device of the first line concentrator shown in FIG. 19.

Next, the first line concentrator 10C in the embodiment 3 will be explained with reference to FIGS. 19 and 20. FIG. 19 is a block diagram showing a hardware architecture of the first line concentrator 10C in the embodiment 3. Referring again to FIG. 19, the first line concentrator 10C is constructed of a CPU 83, a plurality of interfaces 84, a buffer memory 85, a switch controller 86, a memory device 87 and a main memory 88. These components are the same as those of the first line concentrator 10A shown in FIG. 13, and therefore their explanations are omitted. Storage contents of the memory device 87 are, however, different. FIG. 20 is a block diagram showing the storage contents of the memory device 87 in the first line concentrator 10C. Referring to again FIG. 20, a first address converting function 142 and a line concentrator address memory table 141a are the same as those in the embodiment 2, and therefore their explanations are omitted. Contrastingly, a first analyzing function 141 checks whether or not the packet accumulated in a buffer memory 83 is the ARP request packet and also checks whether this ARP request packet is received from the side of the terminal 120 (end side) or the side of the second line concentrator 10D (backbone LAN side). Then, the first analyzing function 141, when determining that the packet accumulated in the buffer memory 83 is the ARP request packet received from the end side, as in the same way with the embodiment 2, notifies the first address converting function 142 of this purport, and terminates this packet. While on the other hand, the first analyzing function 141, when determining that the packet accumulated in the buffer memory 83 is the ARP request packet received from the backbone LAN side, notifies the second address converting function 142a of this purport. Further, the second address converting function 142a (corresponding to a second address converting element) is actuated upon receiving the notification from the first analyzing function 141. The second address converting function 142a converts packet-transmitted address of the ARP request packet accumulated in the buffer memory 83 into a broadcast designation, and transmits it to a predetermined broadcast domain. Note that the second address converting function 142a is also defined as a control program stored in the memory device 87 and therefore a function actualized by the CPU 87 executing this control program down-loaded into the main memory 88.

Figure 21:
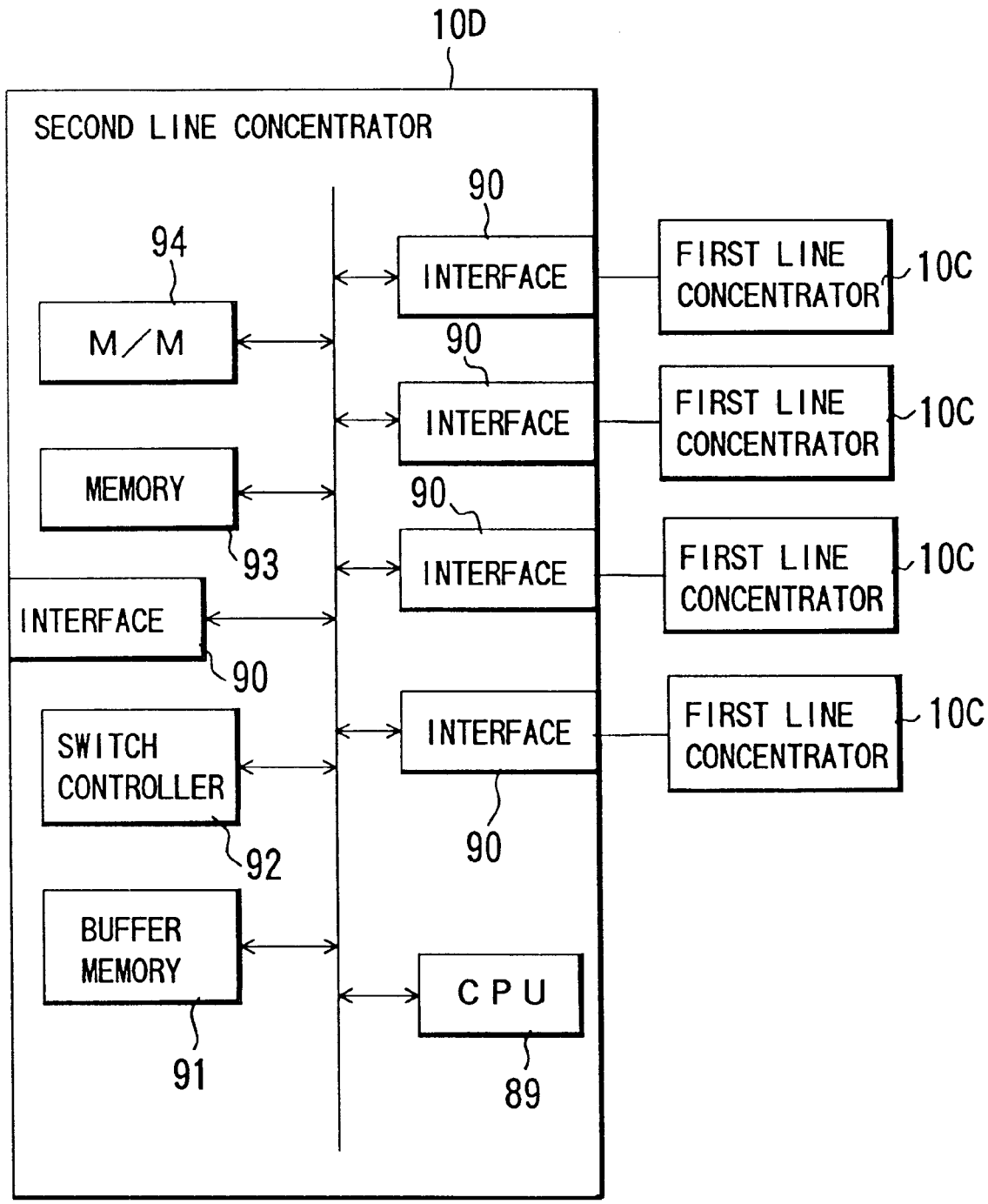
FIG. 21 is a block diagram illustrating a construction of a second line concentrator shown in FIG. 18.
Figure 22:
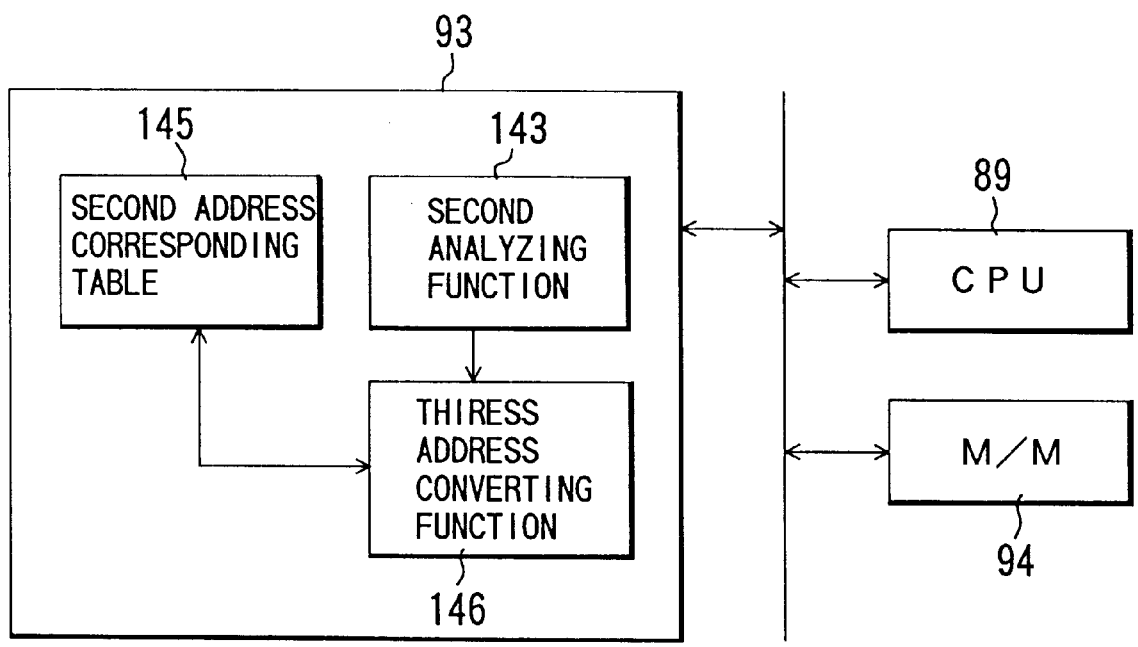
FIG. 22 is a block diagram illustrating a memory device of the second line concentrator shown in FIG. 21.

Next, the second line concentrator 10D in the embodiment 3 will be explained with reference to FIGS. 21 and 22. FIG. 21 is a block diagram illustrating a hardware architecture of the second line concentrator 10D. Referring again to FIG. 21, the second line concentrator 10D is constructed a CPU 89, a plurality of interfaces 90, a buffer memory 91, a switch controller 92, a memory device 93 and a main memory 94. These components are substantially the same as those of the second line concentrator 10B, and therefore their explanations are omitted. Storage contents of the memory device 93 are, however, different. FIG. 20 is a block diagram showing the storage contents of the memory device 93 in the second line concentrator 10D. Referring again to FIG. 20, the memory device 93 is stored with a second analyzing function 143, a second address corresponding table 145 and a third address converting function 146 (corresponding to a third address converting element). Herein, the second analyzing function 143 analyzes a content of the packet accumulated in the buffer memory 91 and checks whether or not the this packet is the ARP request packet. Subsequently, the second analyzing function 143, when determining that the packet is the ARP request packet, notifies the third address converting function 146 of this purport, and terminates this ARP request packet. Further, the second address corresponding table 145 is stored with all the IP addresses in the network system in such a form as to correspond to the MAC addresses of the respective line concentrators 10C. That is, the IP addresses of the respective terminals are stored corresponding to the MAC addresses of the first line concentrators 10C connected to the terminals thereof. Further, the third address converting function 146 extracts the IP address of the terminal 120 requesting the supply of the MAC address from the ARP request packet accumulated in the buffer memory 91. The third address converting function 146 then retrieves the second address corresponding table 145 with that IP address serving as a retrieval key, and detects the MAC address of the first line concentrator 10C that corresponds to the IP address. Subsequently, the third address converting function 146 converts the packet-transmitted MAC address of the ARP request packet accumulated in the buffer memory 91, into the MAC address of the first line concentrator 10C that has been detected from the second address corresponding table 145, and transmits the MAC address to the same first line concentrator 10C. Note that the second analyzing function 143 and the third address converting function 146 are defined as control programs stored in the memory device 93 and therefore functions actualized by the CPU 89 executing these control programs down-loaded into the main memory as the necessity arises.

Figure 23:
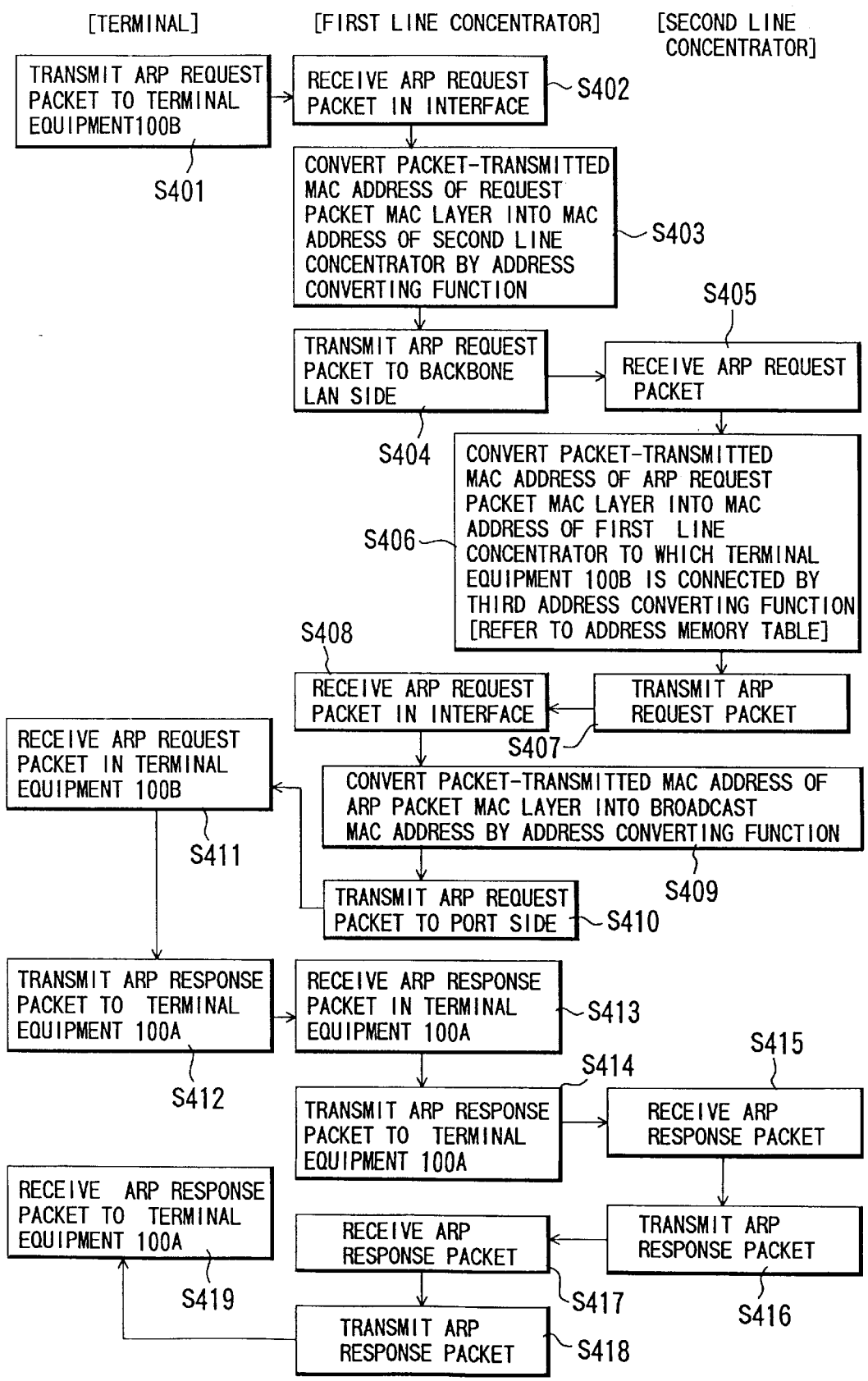
FIG. 23 is a flowchart showing an example of operation of the network system shown in FIG. 18.

Explained next with reference to a flowchart shown in FIG. 23 is such a case that, in the network system having the above construction, the terminal 120A belonging to a broadcast domain A shown in FIG. 18 broadcasts the ARP request packet in order to obtain the MAC address of the terminal 120B belonging to a broadcast domain B. First, the ARP request packet is broadcasted from the terminal 120A to the terminal 120B <step S401>.

This ARP request packet is transmitted via the communication line to a first line concentrator $10C_1$. In the first line concentrator $10C_1$, the ARP request packet is received by the interface 84 shown in FIG. 19 and then accumulated in the buffer memory 85. Thereupon, the first analyzing function 141 shown in FIG. 20 is actuated and analyzes a content of the ARP request packet. With this analysis, the first analyzing function 141, when determining that the packet accumulated in the buffer memory 85 is the ARP request packet received from the first address converting function 142 of this purport and terminates this ARP request packet <step S402>.

Next, the first address converting function 142 reads the MAC address of the second line concentrator 10D from the line concentrator address memory table 141a. Subsequently, the first address converting function 142 generates the ARP request packet wherein the packet-transmitted address of the ARP request packet accumulated in the buffer memory 85 is converted into the MAC address of the second line concentrator 10D <step S403>.

Then, the ARP request packet generated in step S403 is unicasted to the second line concentrator 10D from the interface 84a (see FIG. 13) on the side of the backbone LAN <step S404>.

Next, in the second line concentrator 10D, the ARP request packet is received by the predetermined interface 90 shown in FIG. 21 and accumulated in the buffer memory 91. Hereupon, the second analyzing function 143 illustrated in FIG. 22 is actuated. The second analyzing function 143 analyzes a content of the packet accumulated in the buffer memory 91. The second analyzing function 143, when determining that the packet is the ARP request packet, notifies the third address converting function 146 of this purport and terminates this ARP request packet <step S405>.

Next, the third address converting function 146, upon receiving the notification from the second analyzing function 143, actuated and extracts the IP address of the terminal 120B from the ARP request packet accumulated in the buffer memory 91. Then, the third address converting function 146 retrieves the second address corresponding table 145 in accordance with the extracted IP address, and detects the MAC address of a first line concentrator $C_2$ to which the terminal 120B is connected. Further, the third address converting function 146 generates the ARP response packet wherein the packet-transmitted address of the ARP request packet accumulated in the buffer memory 91 is converted into the MAC address of the first line concentrator $10C_2$ <step S306>.

Then, the ARP response packet that is to be transmitted to the terminal $10C_2$ is transmitted from the interface 90 accommodating the communication line connected to the first line concentrator $10C_2$. The ARP request packet is thereby unicasted to the first line concentrator $10C_2$ <step S407>.

Then, this ARP request packet is received by the interface 84a (see FIG. 19), on the side of the backbone LAN, of the first line concentrator $10C_2$ and accumulated in the buffer memory 85. Hereupon, the first analyzing function 141 shown in FIG. 20 analyzes a content of the packet and determines that the packet is the ARP request packet received from the interface 84a on the side of the backbone LAN. Then, the first analyzing function 141 notifies the second address converting function 142a of this purport <step S408>.

Next, the second address converting function 142a converts, into the broadcast designation, the packet-transmitted MAC address of the ARP request packet accumulated in the buffer memory 85 <step S409>. Subsequently, the second address converting function 142a broadcasts, to the broadcast domain B, the ARP request packet wherein the packet-transmitted address is converted in step S409 <step S410>.

Thus, the ARP request packet is broadcasted to the broadcast domain B and thereby received by the terminal 120B <step S411>. The terminal 120B analyzes a content of the ARP request packet, generates the ARP response packet containing the self MAC address and wherein the transmission destination address serves as the MAC address of the terminal 120A, and unicasts the ARP response packet to the first line concentrator 10C$_2$ <step S412>.

The first line concentrator 10C$_2$ receives the ARP response packet from the terminal 120B <step S413>, and unicasts the ARP response packet to the second line concentrator 10D based on the packet-transmitted MAC address contained in the ARP response packet <step S414>.

The second line concentrator 10D receives the ARP response packet from the first line concentrator 10C$_2$ <step S415>, and unicasts this ARP response packet to the first line concentrator 10C$_1$ to which the terminal 120A connected on the basis of the packet-transmitted MAC address contained in the ARP response packet <step S416>.

The first line concentrator 10C$_1$ receives the ARP response packet from the second line concentrator 10D <step S417>, and unicasts this ARP response packet to the terminal 120A on the basis of the packet-transmitted MAC address contained in the ARP response packet <step S418>.

Then, the ARP response packet is received by the terminal 120A <step S419>. The terminal 120A thereby obtains the MAC address of the terminal 120B and is capable of transmitting the data to the terminal 120B.

Note that the data-transmitting or data-transmitted terminals 120 are not confined to the above terminals 120A, 120B, but all the terminals 120 may be the data-transmitting or data-transmitted terminals.

The advantages of the network system in the embodiment 3 discussed above are the same as those in the embodiment 2 of the network system. However, the network system in the embodiment 3 is capable of making the contents stored in the address memory table 45 much less than by the network system in the embodiment 2.

Note that the second line concentrator 10D in the embodiment 3 may be constructed of the conventional line concentrator and an address resolution server.

<Embodiment 4>

Next, an embodiment 4 of the network system will be discussed with reference to the drawings. The embodiment 4 of the network system is also concerned with Ethernet, wherein the network protocol is IP (Internet Protocol).

Figure 24:
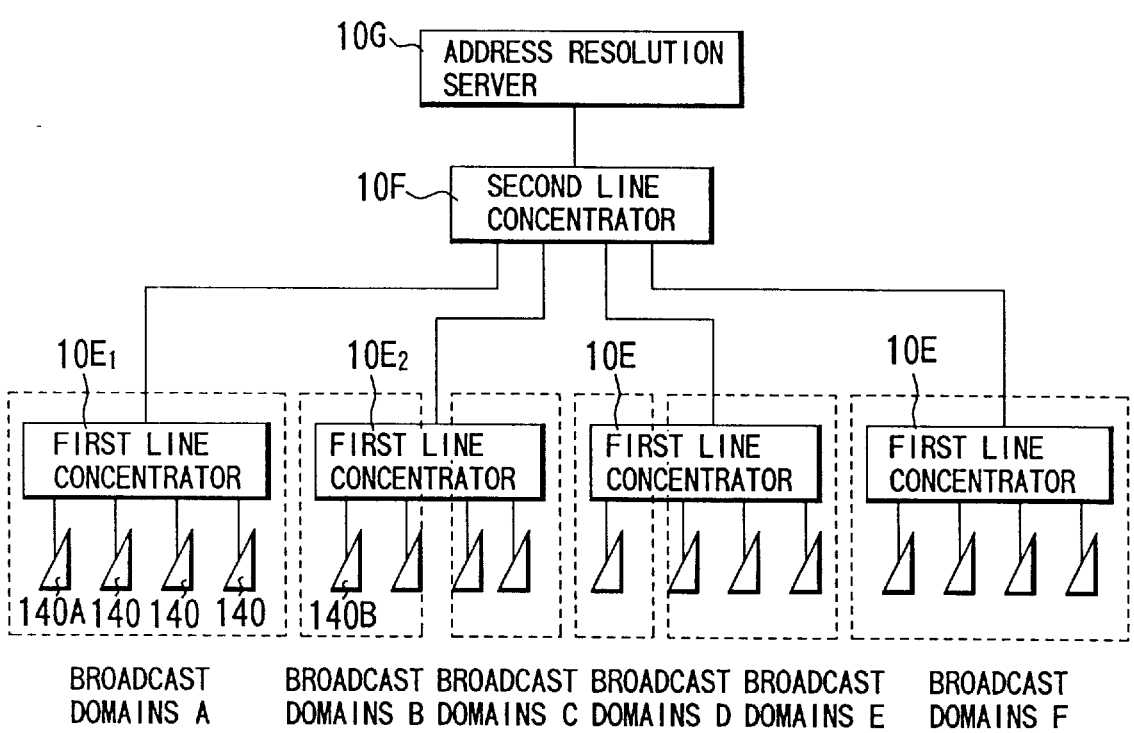
FIG. 24 is a block diagram illustrating a whole construction of the network system in accordance with a fourth embodiment of the present invention.

First, an outline of the embodiment 4 of the network system will be explained with reference to a block diagram of FIG. 24. Referring to FIG. 24, the network system has the star-like topology, wherein a plurality of line concentrators 10E each defined as a LAN switch (switching HUB) are provided, and a plurality of terminals 140 are connected via the communication lines to the first line concentrators 10E. Provided further is a second line concentrator 10F defined as a LAN switch (switching HUB) as a host line concentrator above the first line concentrators 10E. The second line concentrator 10F is connected via the communication lines to each of the first line concentrators 10E. Then, an address resolution server 10G (hereinafter called an "address server") is provided as a host device above the second line concentrator 10F and is connected via the communication line to the second line concentrator 10F. Note that the plurality of terminals 140 connected to the first line concentrators 10E are divided into arbitrary broadcast domains A–F by setting of the respective first line concentrators 10E.

Referring again to FIG. 24, each terminal 140 has predetermined items of data and, when transmitting the self-possessed data to one of other terminals 140, requires an IP address and a MAC address of this data-transmitted terminal 140. Hence, if the data-transmitting terminal has no MAC address of the data-transmitted terminal, the data-transmitting terminal 140 transmits the ARP (Address Resolution Protocol) request packet defined as a packet for seeking the unknown MAC address (which corresponds to an address requesting element). This ARP request packet contains pieces of address data such as an IP address of the terminal requesting a supply of the MAC address, a data-transmitting MAC address and a data-transmitted MAC address.

Figure 25:
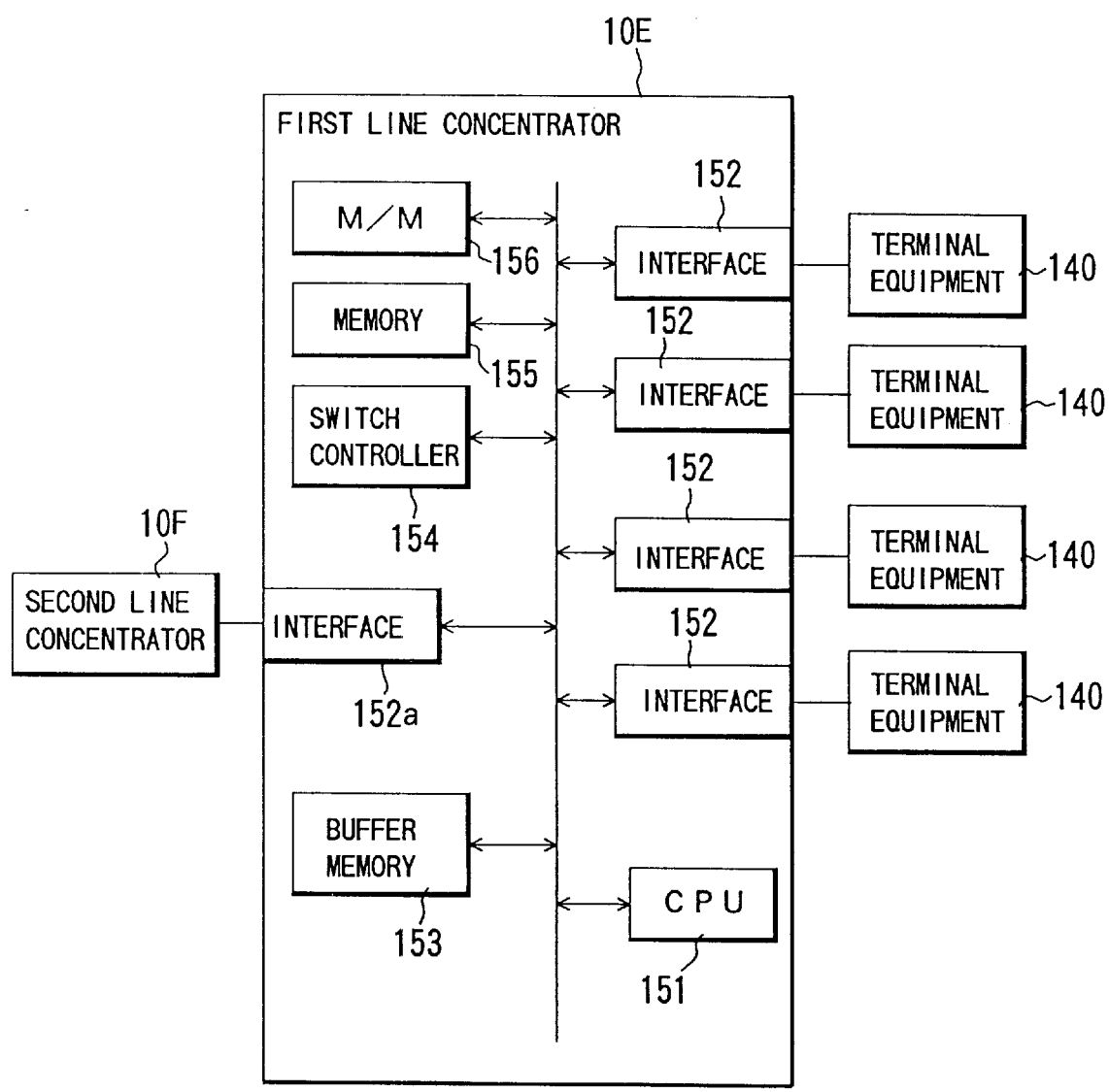
FIG. 25 is a block diagram showing a construction of the first line concentrator shown in FIG. 24.
Figure 26:
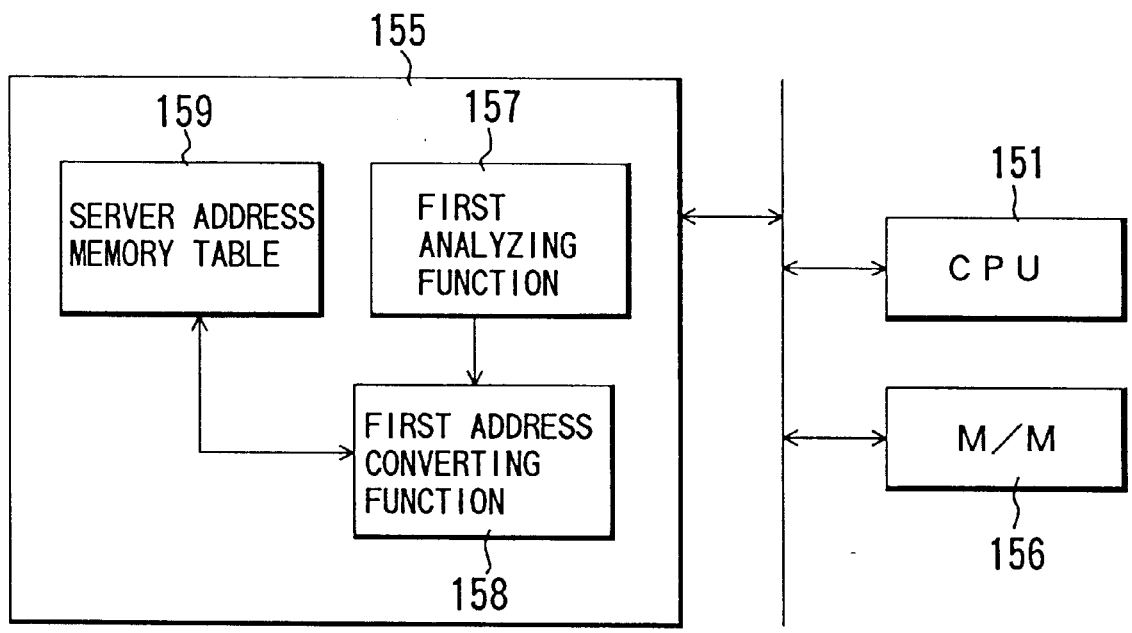
FIG. 26 is a block diagram illustrating the memory device of the first line concentrator shown in FIG. 25.

Next, the first line concentrator 10E will be described with reference to FIGS. 25 and 26. FIG. 25 is a block diagram illustrating a hardware architecture of the first line concentrator 10E. Referring to FIG. 25, the first line concentrator 10E is constructed of a CPU 51, a plurality of interfaces 152, a buffer memory 153, a switch controller 154, a memory device 155 and a main memory 156. These components are the same as those in the embodiment 1, and therefore their explanations are omitted. Storage contents of the memory device 155 are, however, different from those in the embodiment 1. FIG. 26 is a block diagram showing the storage contents of the memory device 155 in the first line concentrator 10E. Referring to FIG. 26, the memory device 155 is stored with a first analyzing function 157, a first address converting function (corresponding to a first address converting element) 158, and a server address memory table 159. Herein, the server address memory table 159 is stored with a MAC address of the address server 10G. Further, the first analyzing function 41 analyzes contents of the packets accumulated in the buffer memory 153. The first analyzing function 157, when determining that the packet concerned is the ARP request packet, notifies the first address converting function 158 of this purport, and then terminates the ARP request packet. Furthermore, the first address converting function 158 reads the MAC address of the address server 10G that is stored in the server address memory table 159. The first address converting function 158 then converts a packet transmitted address of the ARP request packet accumulated in the buffer memory 153, into a MAC address of the address server 10G based on a broadcast designation, and transmits the same ARP request packet to the second line concentrator 10F. Note that the above first analyzing function 157 and first address converting function 158 are defined as control programs stored in the memory device 155 and therefore functions actualized by the CPU 151 executing these control programs read to the main memory 156 as the necessity arises.

Figure 27:
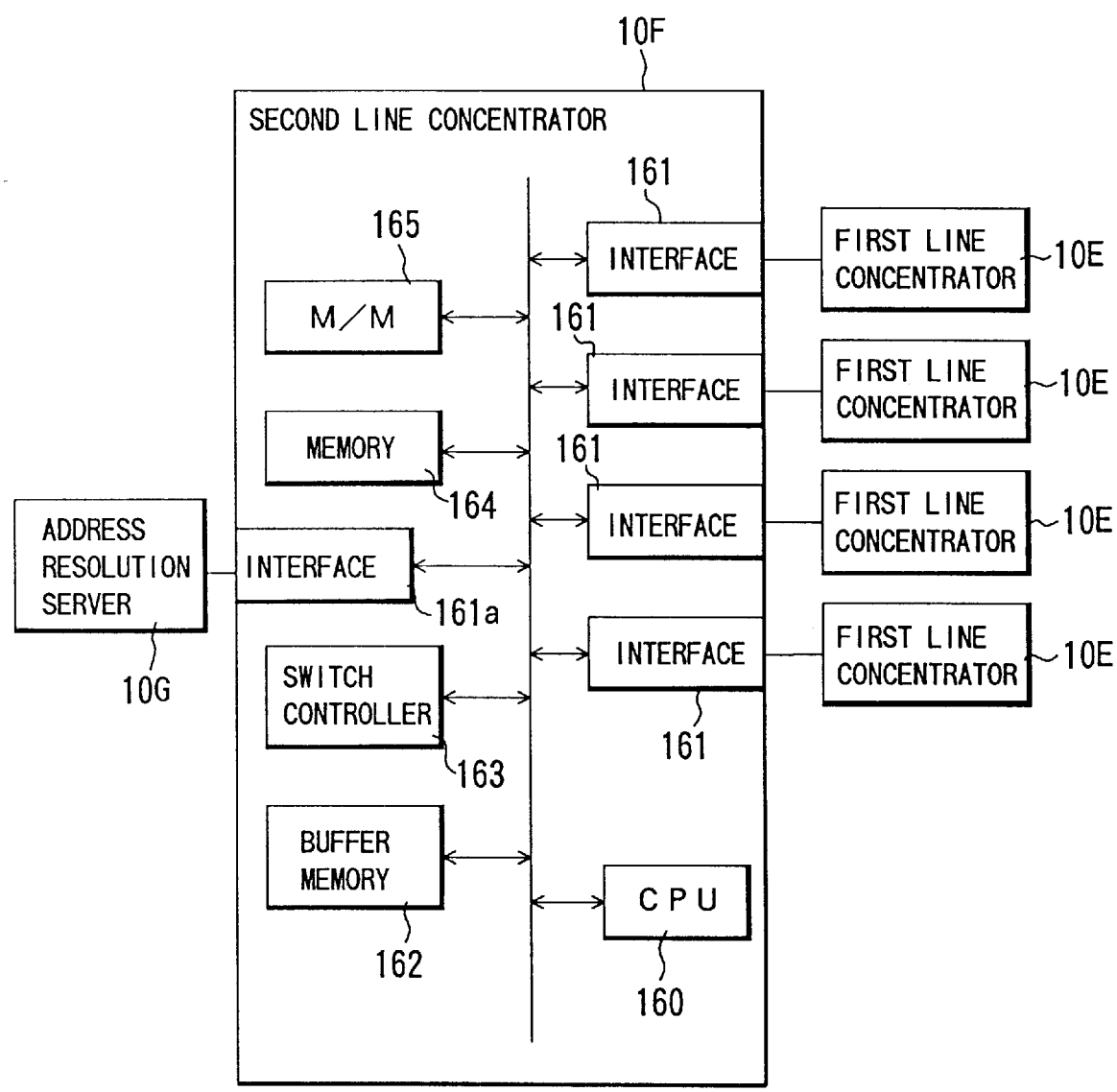
FIG. 27 is a block diagram illustrating a construction of the second line concentrator shown in FIG. 24.

Next, the second line concentrator 10F will be explained with reference to FIG. 27. FIG. 27 is a block diagram illustrating a hardware architecture of the second line concentrator 10F. Referring again to FIG. 27, the second line concentrator 10F is constructed a CPU 160, a plurality of interfaces 161, a buffer memory 162, a switch controller 163, a memory device 164 and a main memory 165. These components are substantially the same as those of the first line concentrator 10E, and therefore their explanations are omitted. The second line concentrator 10F is provided with a conventional LAN switch. When the interfaces 161, 161a receive the packets (including the ARP request packet and the ARP response packet), the packet-transmitted MAC address is collated to a MAC address table stored in the memory device 20, thus determining a packet transmission destination. Then, the packets are properly transmitted from the predetermined interfaces 161, 161*a* (corresponding to an ARP packet routing element).

Figure 28:
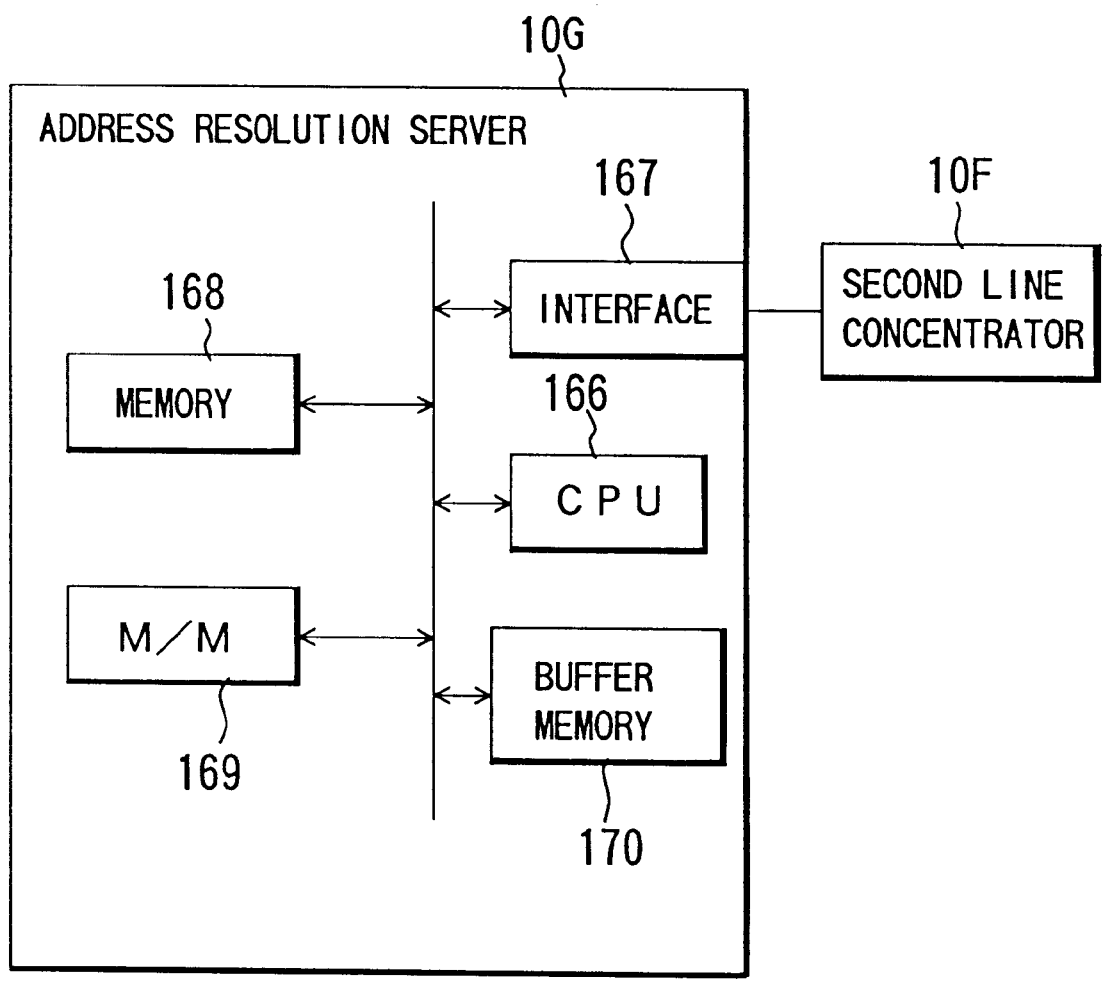
FIG. 28 is a block diagram illustrating a construction of an address resolution server shown in FIG. 24.
Figure 29:
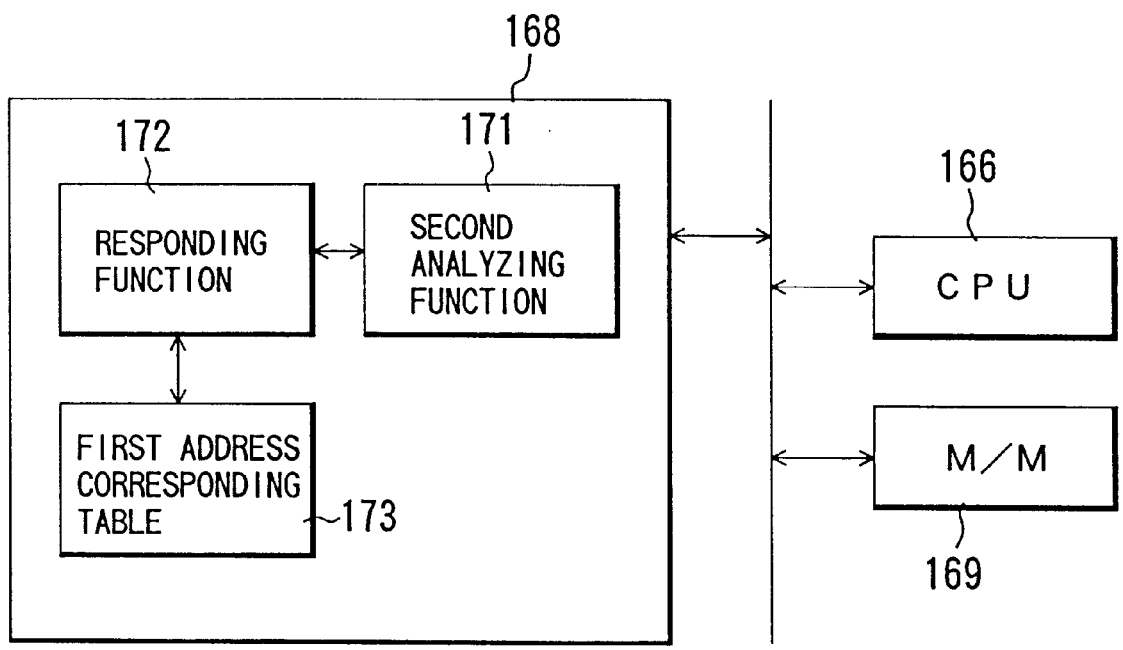
FIG. 29 is a block diagram illustrating the memory device of the second line concentrator shown in FIG. 28.

Next, the address server 10G will be de scribed with reference to FIGS. 28 and 29. FIG. 28 is a block diagram showing a hardware architecture of the address server 10G. Referring again to FIG. 28, the address server 10G is constructed of a CPU 166, a plurality of interfaces 167, a buffer memory 168, a memory device 169 and a main memory 170. These components are substantially the same as those of the second line concentrator 10B shown in FIG. 12, and therefore their explanations are omitted. Storage contents of the memory device 169 are, however, as follows. FIG. 29 is a block diagram showing the storage contents of the memory device 169 of the address server 10G. Referring to again FIG. 29, the memory device 169 is stored with a second analyzing function 171, a responding function 172 and a first address corresponding table 173. Herein, the first address corresponding table 173 is stored with the IP addresses of all the terminals 140 in the present network system in such a form as to correspond to the MAC addresses. Further, the second analyzing function 171 analyzes a content of the packet received by an interface 167 of the address server 10G and accumulated in the buffer memory 168. Then, the second analyzing function 171, when determining that the packet is the ARP request packet, terminals this ARP request packet and notifies the responding function 172 of this purport. Furthermore, the responding function 172 extracts the IP address of the terminal requesting the supply of the MAC address from the ARP request packet accumulated in the buffer memory 168. The responding function 172 then retrieves inside the address corresponding table 173 with the IP address serving as a retrieval key, and detects the MAC address corresponding to the IP address. Subsequently, the responding function 172 extracts the MAC address of the terminal that has transmitted the ARP request packet from the ARP request packet accumulated in the buffer memory 167. Then, the responding function 172, when the terminal transmitting the ARP request packet is set as a destination of transmission, generates an ARP response packet containing the MAC address requested for the supply thereof by the same terminal. Note that the second analyzing function 171 and the responding function 172 are defined as control programs stored in the memory device 20 in terms of hardware and therefore functions actualized by the CPU 12 executing these control programs read to the main memory 20*a* according to the necessity.

Figure 30:
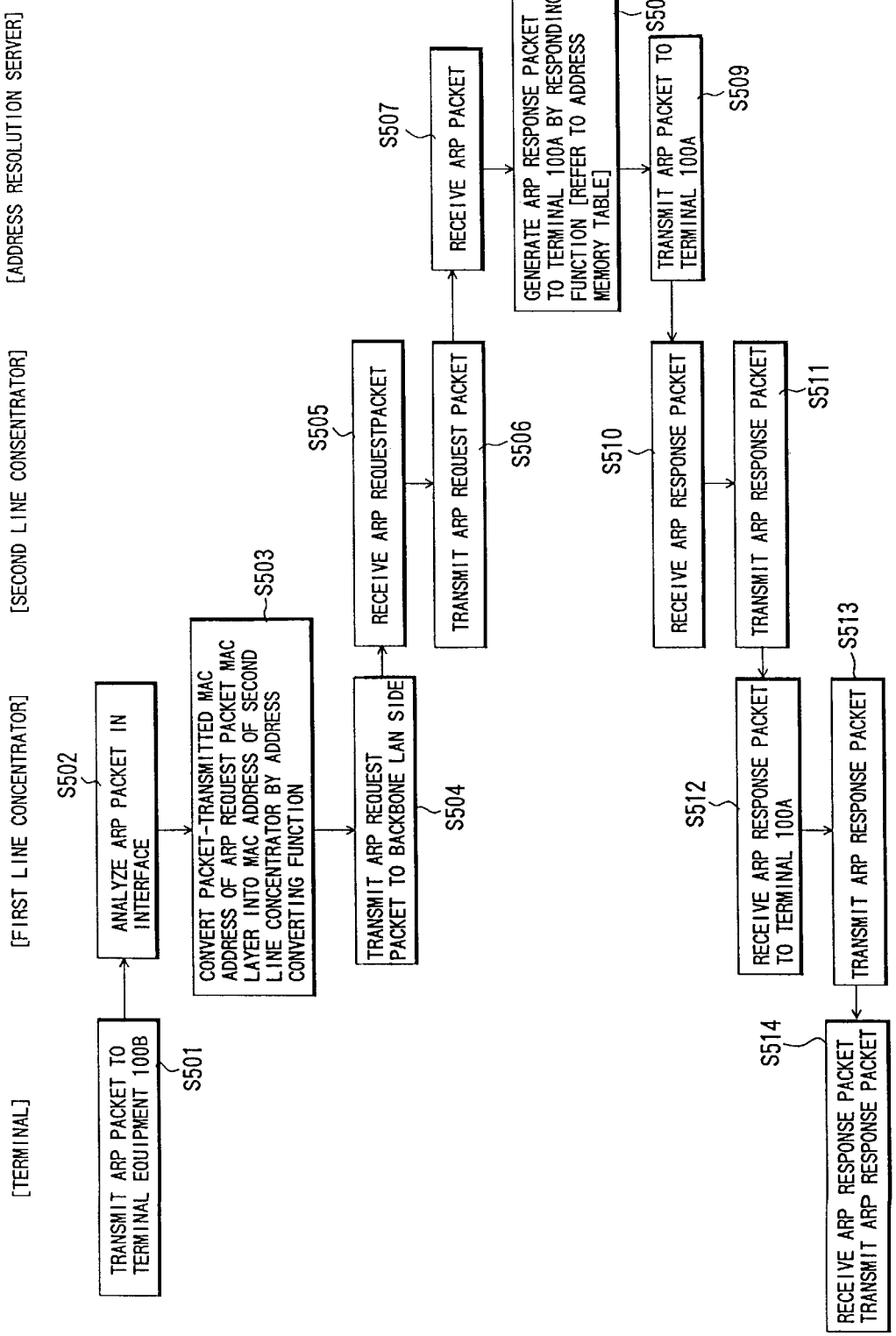
FIG. 30 is a flowchart illustrating an example of operation of the network system shown in FIG. 24.
Figure 31:
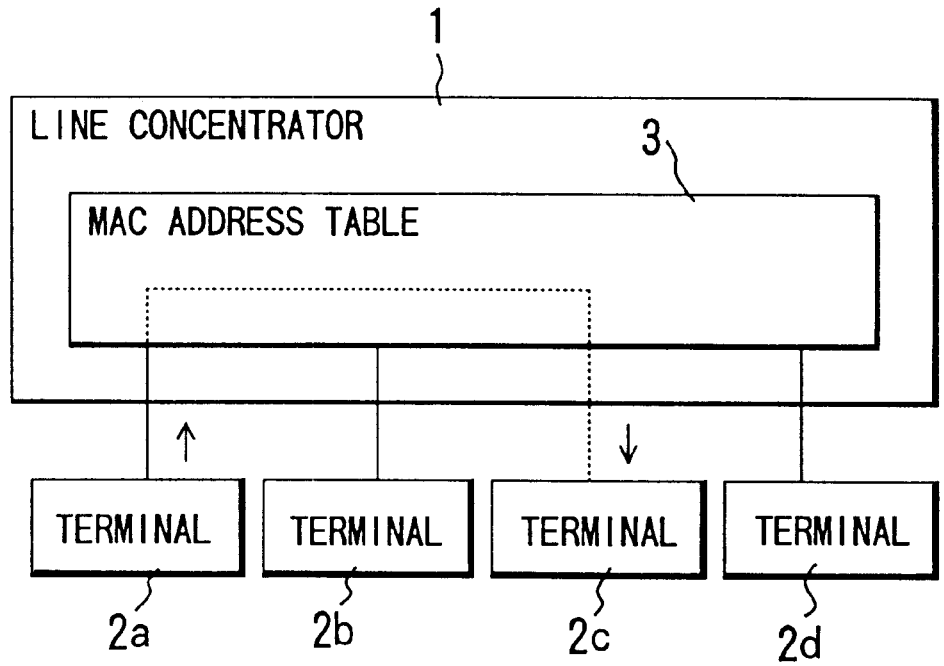
FIG. 31 is a block diagram showing a prior art example.
Figure 32:
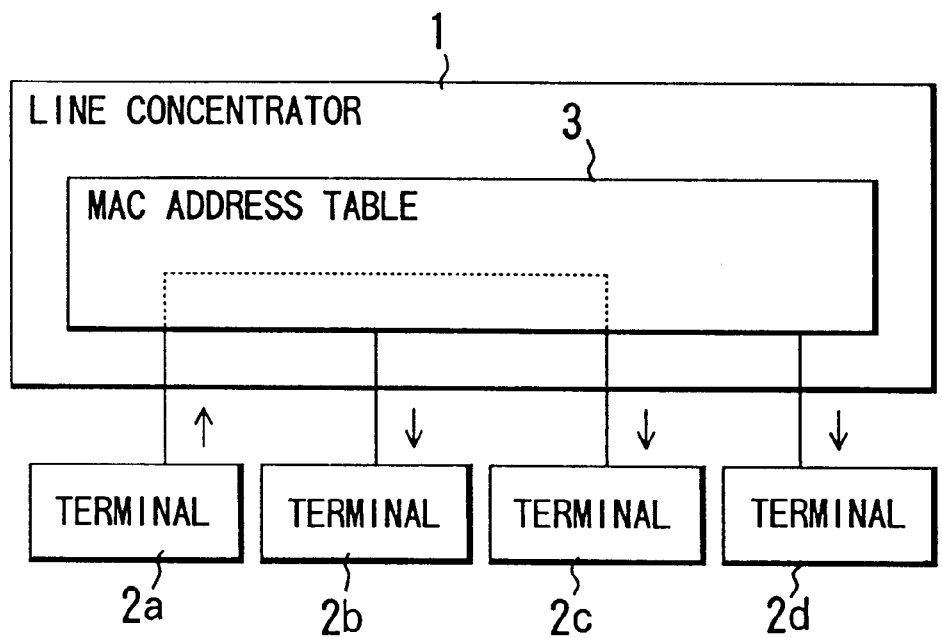
FIG. 32 is a block diagram showing a prior art example.
Figure 33:
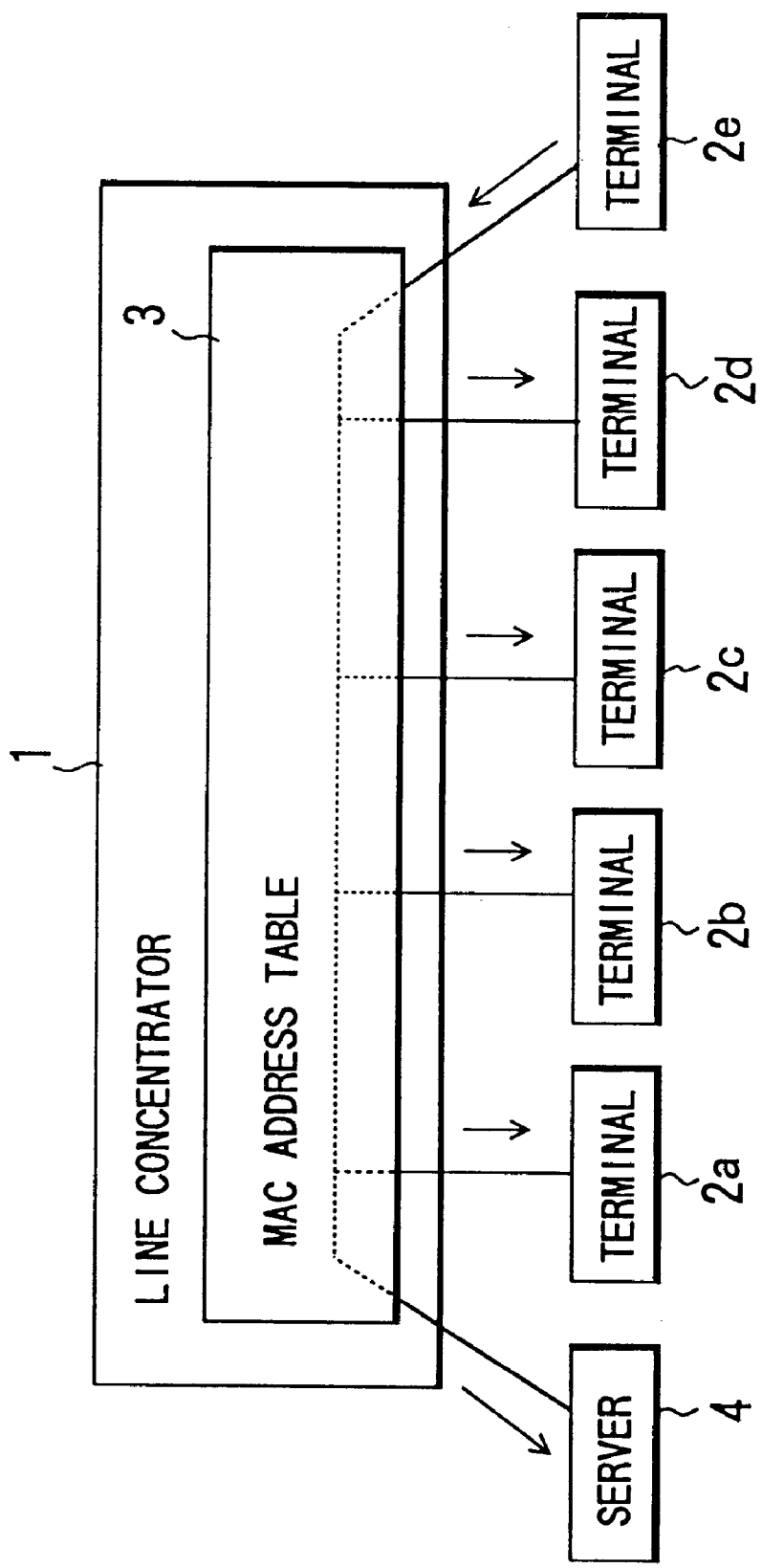
FIG. 33 is a block diagram showing a prior art example.
Figure 34:
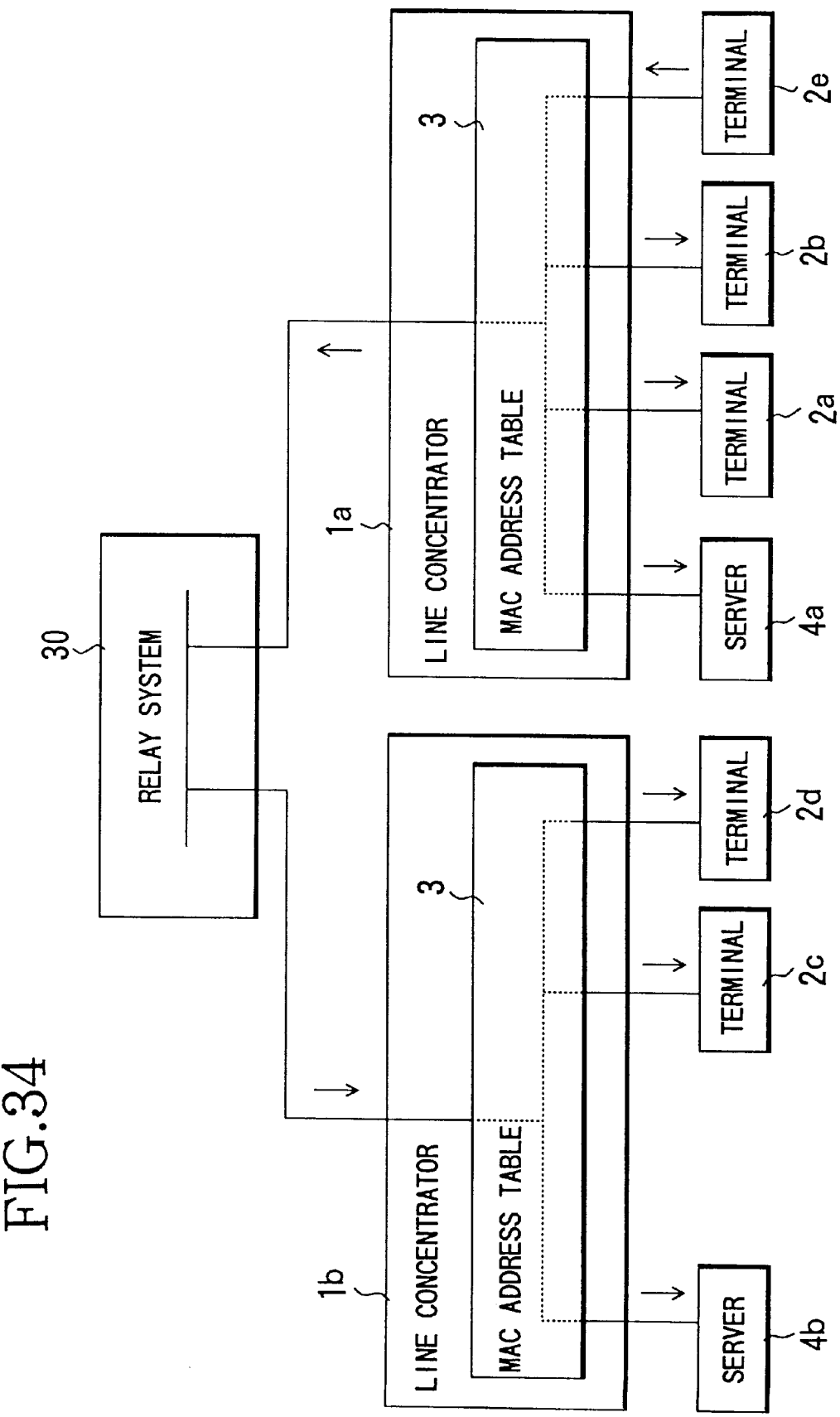
FIG. 34 is a bock diagram showing a prior art example.

Explained next with reference to a flowchart of FIG. 30 is such a case that, in the network system having the above construction, the terminal 140A belonging to the broadcast domain A shown in FIG. 24 transmits the ARP request packet in order to obtain the MAC address of the terminal 140B belonging to the broadcast domain B. First, the ARP request packet requesting the supply of the MAC address of the terminal 140B is broadcasted from the terminal 140A <step S501>.

This ARP request packet is transmitted via the communication line to the first line concentrator 10E, received by a predetermined interface 152 (see FIG. 25) and accumulated in the buffer memory 153. The first analyzing function 157 is thereby actuated and analyzes a content of the ARP request packet. The first analyzing function 157, when determining that the packet accumulated in the buffer memory 153 is the ARP request packet from the analysis, notifies the first address converting function 158 of this purport and terminates the same ARP request packet <step S502>.

Next, the first address converting function 158 is actuated and reads the MAC address of the address server 10G from the server address memory table 159. The first address converting function 158 then generates the ARP request packet wherein the packet-transmitted address of the ARP request packet accumulated in the buffer memory 153 is converted into the MAC address of the address server 10G from the broadcast designation <step S503>.

Then, the ARP request packet with the conversion of the packet-transmitted address in step S503 is sent from an interface 152*a* on the side of the backbone LAN. More specifically, the ARP request packet is unicasted to the second line concentrator 10F <step S504>.

Next, in the second line concentrator 10F, the ARP request packet is received by the predetermined interface 161 (see FIG. 27) and accumulated in the buffer memory 162 <step S505>. The second line concentrator 10F unicasts the ARP request packet to the address server 10G based on the packet-transmitted MAC address (MAC address of the address server 10G) contained in the ARP request packet <step S506>.

Next, the ARP request packet is received by the interface 167 (see FIG. 28) and accumulated in the buffer memory 168. Hereupon, the second analyzing function 171 is actuated. The second analyzing function 171 analyzes a content of the packet accumulated in the buffer memory 168. The second analyzing function 168, when determining that the packet is the ARP request packet, notifies the responding function 172 of this purport and terminates the same ARP request packet <step S507>.

Next, the responding function 172 is, upon receiving the notification from the second analyzing function 171, actuated and extracts the IP address of the terminal 140B from the ARP request packet accumulated in the buffer memory 167. Then, the responding function 172 retrieves the address corresponding table 173 in accordance with the extracted IP address, and detects the MAC address of the terminal 140B that is stored corresponding to the IP address of the terminal 140B. Further, the responding function 172 generates the ARP response packet containing the MAC address of this terminal 140B and with the MAC address of the terminal 140A serving as a transmission destination address <step S508>.

Then, the ARP response packet that is to be transmitted to the terminal 140A is unicasted to the second line concentrator 10F from the predetermined interface 167 <step S509>.

When this ARP response packet is received by the second line concentrator 10F <step S510>, the ARP response packet is unicasted to the first line concentrator 10E to which the terminal 140A is connected based on the packet-transmitted MAC address contained in the ARP response packet <step S511>.

The first line concentrator 10E, upon receiving the ARP response packet <step S512>, unicasts the ARP response packet t the terminal 140A on the basis of the packet-transmitted MAC address contained in the ARP response packet <step S513>.

Then, the terminal 140A receives the ARP response packet <step S514>. With this processing, the terminal 140A thereby obtains the MAC address of the terminal 140B and is therefore capable of transmitting the data to the terminal 140B.

The advantages of the network system in accordance with the embodiment 4 are substantially the same as the advantages of the network system in the embodiment 2. However, the construction possessed by the second line concentrator 10F in the embodiment 2 is incorporated into the address server 10G, and this address server 10G specializes in processing the ARP request packets. Therefore, the ARP request packets can be processed faster than in the embodiment 2, and the processing burden upon the second line concentrator 10F can be relieved.

It is apparent that, in this invention, a wide range of different working modes can be formed based on the invention without deviating from the spirit and scope of the invention. This invention is not restricted by its specific working modes except being limited by the appended claims.

What is claimed is:

1. A network address supply system comprising:
    a plurality of terminal equipment;
    a server; and
    a switching HUB to which said plurality of terminal equipment and said server are connected via communication lines,
    each of said plurality of terminal equipment comprising:
        an address supply requesting unit, when a terminal equipment does not have a network address of the terminal equipment itself, broadcasting an address supply request broadcast packet to said switching HUB,
    said switching HUB comprising:
        a plurality of interfaces,
        a first line data storing unit storing information about an interface receiving an address broadcast packet broadcasted from said server as interface information; and
        a communication line control unit, when one of said plurality of interfaces receives an address supply request broadcast packet from one of said plurality of terminal equipment, transmitting the address supply request broadcast packet to only an interface corresponding to the interface information stored in said first line data storing unit,
    said server comprising:
        a network address storing unit storing unused network addresses in said network system, and
        an address supplying unit, when receiving the address supply request broadcast packet, broadcasting an address broadcast packet containing an unused network address stored in said network address storing unit as a response packet to the address supply request broadcast packet.

2. A network system according to claim 1, wherein said switching HUB further includes address requesting unit generating an address supply request broadcast packet and broadcasting the generated address supply request broadcast packet.

3. A network system according to claim 1, wherein said switching HUB includes second line data storing unit, when one of said plurality of interfaces receives the address supply request broadcast packet broadcasted from one of said terminal equipment, storing information about said interface receiving the address supply request broadcast packet as second interface information, and
    wherein said communication line control unit, when one of said plurality of interfaces receives the address broadcast packet broadcasted from said server, transmits the address broadcast packet to only an interface corresponding to the second interface information stored in said second line data storing unit.

4. A network system according to claim 1,
    wherein said address supplying unit, when receiving the address supply request broadcast packet, broadcasts an address broadcast packet containing the unused network address stored in said network address storing unit and a network address of said server itself as a server address,
    wherein said switching HUB includes:
        an address storing unit storing a server address containing an address broadcast packet,
        packet generating unit generating the address supply request packet having a server address stored in said address storing unit as a destination address, when one of said plurality of interfaces receives an address supply request packet from one of said plurality of terminal equipment, and
    wherein said communication line control unit transmits an address request packet generated by said packet generating unit from an interface corresponding to a server address containing the address supply request packet.

5. A network system comprising:
    a plurality of terminal equipment;
    a plurality of switching HUBs to which said plurality of terminal equipment are connected via communication lines; and
    a relay system to which said plurality of switching HUBs are connected via the communication lines,
    said relay system comprising:
        a control packet transmitting unit transmitting a control broadcast packet of said relay system itself and/or said plurality of switching HUBs,
    each of said switching HUBs comprising:
        a plurality of interfaces,
        a packet distinguishing unit, when one of said plurality of interfaces receives the packet from said relay system, determining whether or not the packet received from said relay system is the control broadcast packet, and
        a communication line control unit, when said packet distinguishing unit determines that the packet received from said relay system is the control broadcast packet, making the control broadcast packet untransmissible from said plurality of interfaces.

6. A network system comprising:
    a plurality of terminal equipment;
    plurality of first switching HUBs to which said plurality of terminal equipment are connected via communication lines; and
    a second switching HUB to which said first switching HUBs are connected via the communication lines,
    said plurality of terminal equipment comprising:
        an ARP requesting unit, when having no data-transmitted MAC (Media Access Control) addresses, transmitting ARP (Address Resolution Protocol) request packets containing data-transmitted network addresses of said first switching HUBs,
    said plurality of first switching HUBs comprising:
        a first address converting unit, when receiving the ARP request packet from one of said plurality of terminal equipment, transmitting, to said second switching HUB, the ARP request packet in which the packet-transmitted address of the received ARP request packet is converted into the address of said second switching HUB, said second switching HUB comprising:
  a first address corresponding table stored with the network address in said network system in such a form as to correspond to the MAC address, and
  responding unit, when receiving the ARP request packet from one of said plurality of first switching HUBs, reading from said first address corresponding table the data-transmitted MAC address corresponding to the data-transmitted network address contained in the ARP request packet, generating an ARP response packet containing the data-transmitted MAC address, and transmitting the ARP response packet to said first switching HUB transmitting the ARP request packet.

7. A network system comprising:
a plurality of terminal equipment;
a plurality of first switching HUBs to which said plurality of terminal equipment are connected via communication lines; and
a second switching HUB to which said first switching HUBs are connected via the communication lines,
said plurality of terminal equipment comprising:
  an ARP requesting unit, when having no data-transmitted MAC (Media Access Control) addresses, transmitting ARP (Address Resolution Protocol) request packets containing data-transmitted network addresses of said first switching HUBs,
said plurality of first switching HUBs comprising:
  a first address converting unit, when receiving the ARP request packet from one of said plurality of terminal equipment, transmitting, to said second switching HUB, the ARP request packet in which the packet-transmitted address of the received ARP request packet is converted into the address of said second switching HUB, and
  a second address converting unit, when receiving the ARP request packet from said second switching HUB, transmitting to said plurality of terminal equipment the ARP request packet in which the packet transmitted address of the ARP packet is converted into a broadcast designation,
said second switching HUB comprising:
  an address corresponding table stored with the network addresses in said network system in such a form as to correspond to the MAC addresses of said plurality of first switching HUBs, and
  a third address converting unit,.when receiving the ARP request packet from one of said plurality of first switching HUBs, reading from said address corresponding table the MAC address of said first switching HUB that corresponds to the data-transmitted network address contained in the ARP request packet, generating an ARP request packet in which the MAC address of said first switching HUBs serves as transmission destination addresses, and transmitting the ARP request packets to said relevant first switching HUBs.

8. A network system comprising:
a plurality of terminal equipment;
a plurality of first switching HUBs to which said plurality of terminal equipment are connected via communication lines;
a second switching HUB to which said first switching HUBs are connected via the communication lines; and
an address resolution server to which said second switching HUB is connected via the communication line,
said plurality of terminal equipment comprising:
  an ARP requesting unit, when having no data-transmitted MAC (Media Access Control) address, transmitting an ARP (Address Resolution Protocol) request packet containing a data-transmitted network address of said first switching HUBs,
said plurality of first switching HUBs comprising:
  a first address converting unit, when receiving the ARP request packet from one of said plurality of terminal equipment, transmitting, to said second switching HUB, the ARP request packet in which the packet-transmitted address of the received ARP request packet is converted into the address of said second switching HUB,
said second switching HUB comprising:
  an ARP packet routing unit, when receiving the ARP request packet from each of said first switching HUBs or from said address resolution server, or an ARP response packet corresponding to this ARP request packet, transmitting the ARP request packet or the ARP response packet to the relevant transmission destination on the basis of a packet-transmitted address of the ARP request packet or the ARP response packet,
said address resolution server comprising:
  a first address corresponding table stored with the network address in said network system in such a form as to correspond to the MAC address, and
  a responding unit, when receiving the ARP request packet from said second switching HUB, reading from said first address corresponding table the data-transmitted MAC address corresponding to the data-transmitted network address contained in the ARP request packet, generating an ARP response packet containing the data-transmitted MAC address, and transmitting the ARP response packet to said second switching HUB.

9. A network system comprising:
a plurality of terminal equipment;
a plurality of first switching HUBs to which said plurality of terminal equipment are connected via communication lines;
a second switching HUB to which said first switching HUBs are connected via the communication lines; and
an address resolution server to which said second switching HUB is connected via the communication line,
said plurality of terminal equipment comprising:
  an ARP requesting unit, when having no data-transmitted MAC (Media Access Control) address, transmitting an ARP (Address Resolution Protocol) request packet containing a data-transmitted network address of said first switching HUBs,
said plurality of first switching HUBs comprising:
  a first address converting unit, when receiving the ARP request packet from one of said plurality of terminal equipment, transmitting, to said second switching HUB, the ARP request packet in which the packet-transmitted address of the received ARP request packet is converted into the address of said second switching HUB,
  a second address converting unit, when receiving the ARP packet from said second switching HUB, transmitting to said plurality of terminal equipment the ARP request packet in which the packet-transmitted address of the ARP packet is converted into a broadcast designation, said second switching HUB comprising:
an ARP packet routing unit, when receiving the ARP request packet from each of said first switching HUBs or from said address resolution server, or an ARP response packet corresponding to this ARP request packet, transmitting the ARP request packet or the ARP response packet to the relevant transmission destination on the basis of a packet-transmitted address of the ARP request packet or the ARP response packet, said address resolution server comprising:
an address corresponding table stored with the network address in said network system in such a form as to correspond to the MAC addresses of said plurality of first switching HUBs, and
a second address converting unit, when receiving the ARP request packet from said second switching HUB, reading from said address corresponding table the MAC address of said first switching HUB that corresponds to the data-transmitted MAC network address contained in the ARP request packet, generating the ARP request packet in which the MAC address of said first switching HUB serves as a transmission destination address, and transmitting the ARP request packet to said second switching HUB.

10. A switching HUB for connecting a plurality of terminal equipment and a server to each other via communication lines, each of said plurality of terminal equipment comprising address supply requesting unit broadcasting, when a terminal equipment does not have a network address of the terminal equipment itself, an address supply request broadcast packet, said server comprising:
a network address storing unit storing unused network addresses in a network system, and
an address supplying unit broadcasting, when receiving the address supply request broadcast packet, an address broadcast packet containing an unused network address stored in said network address storing unit as a response packet to the address supply request broadcast packet, said switching HUB comprising:
a plurality of interfaces,
a first line data storing unit storing information about an interface receiving an address broadcast packet broadcasted from said server as interface information, and
a communication line control unit, when one of said plurality of interfaces receives an address supply request broadcast packet from one of said plurality of terminal equipment, transmitting the address supply request broadcast packet to only an interface corresponding to the interface information stored in said first line data storing unit.

11. A switching HUB according to claim 10, further comprising:
address requesting unit generating an address supply request broadcast packet and broadcasting the generated address supply request broadcast packet.

12. A switching HUB according to claim 10, further comprising:
a second line data storing unit, when one of said plurality of interfaces receives the address supply request broadcast packet broadcasted from one of said terminal equipment, storing the information about said interface receiving the address supply request broadcast packet as second interface information,
wherein said communication line control unit, when one of said plurality of interfaces receives the address broadcast packet broadcasted from said server, transmits the address broadcast packet to only an interface corresponding to the second interface information stored in said second line data storing unit.

13. A switching HUB according to claim 11, further comprising:
a timer for measuring a predetermined time,
wherein said address requesting unit, when said timer measures the predetermined time, generates the address supply request broadcast packet and broadcasts the generated address supply request broadcast packet.

14. A switching HUB according to claim 11, further comprising:
a fiducial traffic volume memory table stored with a fiducial traffic volume; and
a traffic measuring unit for measuring a traffic volume per unit time and comparing this measured result with the fiducial traffic volume,
wherein said address requesting unit, when said traffic measuring unit detects a traffic volume less than the fiducial traffic volume, generates the address supply request broadcast packet, and broadcasts the generated address supply request broadcast packet.

15. A switching HUB according to claim 14, further comprising:
a timer measuring a predetermined time,
wherein said traffic measuring unit measures a traffic volume per unit time when said timer measures the predetermined time, and compares the measured result with the fiducial traffic volume.

16. A switching HUB according to claim 12, further comprising:
procedure stopping unit generating a procedure stop broadcast packet to stop packet switching to obtain the unused broadcast packet between said plurality of terminal equipment and said server, and transmitting the same packet to said server.

17. A switching HUB for connecting a plurality of terminal equipment and a server to each other via communication lines, each of said plurality of terminal equipment comprising address supply requesting unit broadcasting, when a terminal equipment does not have a network address of the terminal equipment itself, an address supply request broadcast packet, said server comprising:
a network address storing unit storing unused network addresses in a network system and a server address, and
an address supplying unit broadcasting, when receiving the address supply request broadcast packet, an address broadcast packet containing an unused network address and the server address that are stored in said network address storing unit as a response packet to the address supply request broadcast packet, said switching HUB comprising:
an address storing unit storing the server address,
an address managing unit, when receiving the address supply request broadcast packet from one of said plurality of terminal equipment, reading the server address stored in said address storing unit, and a packet generating unit generating the address supply request packet in which the packet-transmitted address of the address supply request broadcast packet is converted into the network address of said server itself that is read by said address managing unit, and transmitting the same packet to said server.

18. A switching HUB according to claim 17, wherein said address managing unit of said switching HUB stores the network address of said server itself that is contained in the address broadcast packet in said address storing unit, when one of said plurality of interfaces receives the address broadcast packet.

19. A switching HUB for connecting a plurality of terminal equipment and a server to each other via communication lines, each of said plurality of terminal equipment comprising address supply requesting unit broadcasting, when a terminal equipment does not have a network address of the terminal equipment itself, an address supply request broadcast packet, said server comprising:
  a network address storing unit storing unused network addresses in a network system, and
  an address supplying unit broadcasting, when receiving the address supply request broadcast packet, an address broadcast packet containing an unused network address stored in said network address storing unit as a response packet to the address supply request broadcast packet, said switching HUB being connected to a plurality of relay systems transmitting control broadcast packets of said relay systems themselves and/or said switching HUB, said switching HUB comprising:
  a packet distinguishing unit, when receiving the packet from said relay system, determining whether or not the packet received from said relay system is the control broadcast packet, and
  a communication line control unit, when said packet distinguishing unit determines that the packet received from said relay system is the control broadcast packet, making the control broadcast packet untransmissible from said plurality of interfaces.

* * * * *